(12) United States Patent
Knode

(10) Patent No.: US 11,778,492 B2
(45) Date of Patent: Oct. 3, 2023

(54) PERCENTILE FLOOR LINK QUALIFICATION

(71) Applicant: Lutron Technology Company LLC, Coopersburg, PA (US)

(72) Inventor: Galen Edgar Knode, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/110,265

(22) Filed: Dec. 2, 2020

(65) Prior Publication Data

US 2021/0168635 A1    Jun. 3, 2021

Related U.S. Application Data

(60) Provisional application No. 62/942,713, filed on Dec. 2, 2019, provisional application No. 63/022,169, filed
(Continued)

(51) Int. Cl.
  *H04W 24/08* (2009.01)
  *H04B 17/318* (2015.01)
  *H04W 48/16* (2009.01)

(52) U.S. Cl.
  CPC .......... *H04W 24/08* (2013.01); *H04B 17/318* (2015.01); *H04W 48/16* (2013.01)

(58) Field of Classification Search
  CPC ..... H04W 24/08; H04W 48/16; H04B 17/318
  See application file for complete search history.

(56) References Cited

U.S. PATENT DOCUMENTS

| 948,000 | A | 2/1910 | Talbot |
| 5,086,428 | A | 2/1992 | Perlman et al. |

(Continued)

FOREIGN PATENT DOCUMENTS

| CN | 109788500 A | 5/2019 |
| EP | 1443722 A2 | 8/2004 |

(Continued)

OTHER PUBLICATIONS

Moon, et al., "Energy Efficient Data Collection in Sink-Centric Wireless Sensor Networks: A Cluster-Ring Approach", Computer Communications, Elsevier Science Publishers BV, Amsterdam, NL, vol. 101, Jul. 4, 2016, pp. 12-25.

(Continued)

*Primary Examiner* — Duc C Ho
(74) *Attorney, Agent, or Firm* — Flaster Greenberg, P.C.

(57) ABSTRACT

Devices of a control system may communicate with each other via a network. The control devices may be configured to form the network by joining the network and each attempt to attach to another device on the network. Attachment may be performed using one or more link quality thresholds. For example, the control device may measure background values and the link quality threshold may represent an $N^{th}$ percentile value of the recorded background values measured at the control device. During a router optimization mode, the control devices may measure and store a communication quality metrics that may be used to assign the role of router devices and/or the role of leader device to control devices on the network.

31 Claims, 22 Drawing Sheets

Related U.S. Application Data on May 8, 2020, provisional application No. 63/117,759, filed on Nov. 24, 2020.

(56) References Cited

U.S. PATENT DOCUMENTS

| | | | |
|---|---|---|---|
| 5,564,090 A | 10/1996 | Beauchamp et al. | |
| 5,838,226 A | 11/1998 | Houggy et al. | |
| 5,848,054 A | 12/1998 | Mosebrook et al. | |
| 5,905,442 A | 5/1999 | Mosebrook et al. | |
| 6,209,039 B1 | 3/2001 | Albright et al. | |
| 6,262,976 B1 | 7/2001 | McNamara | |
| 7,277,931 B1 | 10/2007 | Booth et al. | |
| 7,391,297 B2 | 6/2008 | Cash et al. | |
| 7,447,800 B2 | 11/2008 | Kobayashi et al. | |
| 7,839,791 B2 | 11/2010 | Holmer et al. | |
| 8,009,042 B2 | 8/2011 | Steiner et al. | |
| 8,149,690 B1 | 4/2012 | Kakkar | |
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,386,613 B2 | 2/2013 | Hopkins | |
| 8,410,706 B2 | 4/2013 | Steiner et al. | |
| 8,451,116 B2 | 5/2013 | Steiner et al. | |
| 8,950,461 B2 | 2/2015 | Adams et al. | |
| 9,125,215 B2 | 9/2015 | Bahr | |
| 9,488,000 B2 | 11/2016 | Kirby et al. | |
| 9,655,214 B1 | 5/2017 | Sooch et al. | |
| 9,655,215 B1 | 5/2017 | Frank et al. | |
| 10,027,127 B2 | 7/2018 | Crafts et al. | |
| 10,264,651 B2 | 4/2019 | Steiner | |
| 10,285,112 B2 | 5/2019 | Zhang et al. | |
| 10,299,356 B1 | 5/2019 | Quilling et al. | |
| 10,379,505 B2 | 8/2019 | Barco et al. | |
| 10,715,599 B2 | 7/2020 | Hao et al. | |
| 10,813,058 B2 | 10/2020 | Qiu | |
| 2003/0031155 A1 | 2/2003 | Idehara | |
| 2006/0067282 A1 | 3/2006 | Sherman et al. | |
| 2006/0149851 A1 | 7/2006 | Matsumoto et al. | |
| 2006/0291485 A1 | 12/2006 | Thubert et al. | |
| 2007/0265790 A1 | 11/2007 | Sealing et al. | |
| 2008/0031129 A1 | 2/2008 | Arseneault et al. | |
| 2008/0036589 A1 | 2/2008 | Werb et al. | |
| 2008/0092075 A1 | 4/2008 | Jacob et al. | |
| 2008/0117907 A1 | 5/2008 | Hein | |
| 2008/0240078 A1 | 10/2008 | Thubert et al. | |
| 2009/0185617 A1* | 7/2009 | Houghton | G05D 1/0038 375/240.01 |
| 2009/0206983 A1 | 8/2009 | Knode et al. | |
| 2009/0245252 A1 | 10/2009 | Kanishi et al. | |
| 2010/0165885 A1 | 7/2010 | Chang et al. | |
| 2010/0177660 A1* | 7/2010 | Essinger | H04W 4/50 370/254 |
| 2010/0278187 A1 | 11/2010 | Hart et al. | |
| 2011/0242968 A1 | 10/2011 | Cirkovic et al. | |
| 2012/0182865 A1 | 7/2012 | Andersen et al. | |
| 2012/0286940 A1 | 11/2012 | Carmen et al. | |
| 2013/0030589 A1 | 1/2013 | Pessina et al. | |
| 2013/0197955 A1 | 8/2013 | Dillon | |
| 2013/0258872 A1 | 10/2013 | Drake et al. | |
| 2013/0336170 A1 | 12/2013 | Broadworth et al. | |
| 2014/0175875 A1 | 6/2014 | Newman et al. | |
| 2014/0177469 A1 | 6/2014 | Neyhart et al. | |
| 2014/0180487 A1 | 6/2014 | Bull et al. | |
| 2014/0210616 A1 | 7/2014 | Ramachandran | |
| 2014/0244834 A1 | 8/2014 | Guedalia et al. | |
| 2014/0265568 A1 | 9/2014 | Crafts et al. | |
| 2014/0281670 A1 | 9/2014 | Vasseur et al. | |
| 2014/0347981 A1 | 11/2014 | Rangne et al. | |
| 2015/0043562 A1 | 2/2015 | Shu | |
| 2015/0131435 A1 | 5/2015 | Kasslin et al. | |
| 2015/0179058 A1 | 6/2015 | Crafts et al. | |
| 2016/0021525 A1 | 1/2016 | Mani et al. | |
| 2016/0119415 A1 | 4/2016 | Han et al. | |
| 2016/0219358 A1 | 7/2016 | Shaffer et al. | |
| 2016/0227481 A1 | 8/2016 | Au et al. | |
| 2016/0330107 A1 | 11/2016 | Thubert et al. | |
| 2017/0041954 A1 | 2/2017 | Tsai et al. | |
| 2017/0068720 A1 | 3/2017 | Ko et al. | |
| 2017/0123390 A1 | 5/2017 | Barco et al. | |
| 2017/0127468 A1 | 5/2017 | Saikusa | |
| 2017/0230231 A1 | 8/2017 | Hsu et al. | |
| 2017/0245132 A1 | 8/2017 | Tsuchie | |
| 2018/0014387 A1 | 1/2018 | Bard et al. | |
| 2018/0167547 A1 | 6/2018 | Casey | |
| 2018/0220476 A1 | 8/2018 | Jung et al. | |
| 2018/0227145 A1 | 8/2018 | Brochi et al. | |
| 2018/0331940 A1 | 11/2018 | Jadhav et al. | |
| 2018/0347271 A1 | 12/2018 | Cooney et al. | |
| 2018/0368048 A1 | 12/2018 | Tsuchie | |
| 2019/0104463 A1 | 4/2019 | Khoury | |
| 2019/0268797 A1 | 8/2019 | Pang et al. | |
| 2019/0394667 A1 | 12/2019 | Shariati | |
| 2020/0052997 A1 | 2/2020 | Ramanathan et al. | |
| 2020/0100138 A1 | 3/2020 | Wu et al. | |
| 2020/0403866 A1 | 12/2020 | Hayes et al. | |
| 2020/0403877 A1 | 12/2020 | Hayes et al. | |
| 2020/0404513 A1 | 12/2020 | Hayes et al. | |
| 2021/0014148 A1 | 1/2021 | Heitz et al. | |
| 2021/0014770 A1 | 1/2021 | Qi et al. | |
| 2021/0194766 A1 | 6/2021 | Crafts et al. | |
| 2021/0352002 A1 | 11/2021 | Knode | |
| 2022/0015172 A1 | 1/2022 | Xu et al. | |
| 2022/0210715 A1 | 6/2022 | Deixler et al. | |
| 2022/0351628 A1 | 11/2022 | Ali et al. | |

FOREIGN PATENT DOCUMENTS

| | | |
|---|---|---|
| EP | 1594266 A1 | 11/2005 |
| EP | 3048762 A1 | 7/2016 |
| KR | 20120060576 A | 6/2012 |

OTHER PUBLICATIONS

KR 20120069576 A, Cited in related PCT Application No. PCT/US20/62959 in Invitation to Pay additional fee dated Mar. 9, 2021.

*Machine Translation of description and claims by Patent Translate Powered by EPO and Google.

Lin, Deyu , et al., "An Energy-Efficient Clustering Algorithm Combined Game Theory and Dual-Custer-Head Mechanism for WSNs", IEE Access, vol. 7 DOI: 10.1109/ACCESS.2019.2911190 [retrieved on Apr. 22, 2019), Apr. 15, 20019, pp. 49894-49905.

Thread Group, Inc. , "Thread Specification", Revision 1.1.1, Feb. 13, 2017, 348 pages.

Parsa , et al., "SIDLE: Semantically Intelligent Distributed Leader Election Algorithm for Wireless Sensor Networks", Aug. 23, 2019, 8 pages.

Saedi , et al., "Generation of realistic signal strength measurements for a 5G Rogue Base Station attack scenario", Jul. 2020, 8 pages.

* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

PERCENTILE FLOOR LINK QUALIFICATION

CROSS-REFERENCE TO RELATED APPLICATIONS

This application claims the benefit of U.S. Provisional Patent Application No. 62/942,713, filed Dec. 2, 2019, U.S. Provisional Patent Application No. 63/022,169, filed May 8, 2020, and U.S. Provisional Patent Application No. 63/117,759, filed Nov. 24, 2020, the entire disclosure of each being hereby incorporated by reference herein.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The control devices may receive messages, which may include load control instructions, for controlling an electrical load from one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control.

SUMMARY

Devices of a control system, such as a load control system and/or lighting control system, may communicate with each other via a network (e.g., a mesh network). The control system may include load control devices, input devices, or other devices capable of communicating with each other to perform load control. The control devices may be configured to first join the network and then attach to one or more other devices on the network (e.g., to form the mesh network), which may be facilitated by a leader device of the network. When the lighting control system is initially installed, the devices may join the network (e.g., by exchanging credentials with a network commissioning device). The devices may then each attempt to attach to another device on the network to form the mesh network (e.g., formation of the network). In order to attach to another device on the network, the device may send and receive a number of messages via the network.

Attachment may be performed using one or more link quality thresholds. For example, the control device may measure background communication quality metric values and the link quality threshold may represent an $N^{th}$ percentile value (e.g., the $95^{th}$ percentile value) of the recorded background communication quality metric values measured at the control device. For example, the background communication quality metric values may be received signal strength indicator (RSSI) values. The control device may calculate the link quality thresholds by adding respective link margins to a noise floor calculated from the background RSSI values.

The network may include router devices (e.g., a leader device and other router devices) for enabling communication of messages throughout the network. The quality of a control device's network links with other devices may be considered when assigning the control device a role. For example, networks may enter a router optimization mode to optimize the locations of the router devices in the network (e.g., to adjust the control devices that are assigned the role of a router device). A router optimization mode may be initiated by a user via an application running on a computing device. Also, or alternatively, the router optimization mode may be triggered periodically or by one of the control devices in the network detecting a change in the quality of network communications.

During a router optimization mode, the control devices that are communicating over the network may transmit (e.g. via unicast, multicast, and/or broadcast) one or more optimization messages. The control devices that receive these optimization messages may measure and store a communication quality metric of the optimization message along with an indication of the device that transmitted the optimization message (e.g., optimization data). This optimization data may identify the number and quality of network links that a control device has established on the network. Each of the control devices may then transmit their respective optimization data to another device (e.g., a system controller) that processes the optimization data.

The system controller, or another control device on the network, may process and analyze the optimization data to determine the optimal role of a control device (e.g., to determine optimal locations for the router devices of the network). The control devices having a greater number of network links having a communication quality link above the defined quality threshold may be assigned as router devices in the network.

BRIEF DESCRIPTION OF THE DRAWINGS

FIG. 2F is a table that illustrates example link costs that may correspond to different link qualities.

DETAILED DESCRIPTION

Figure 1:
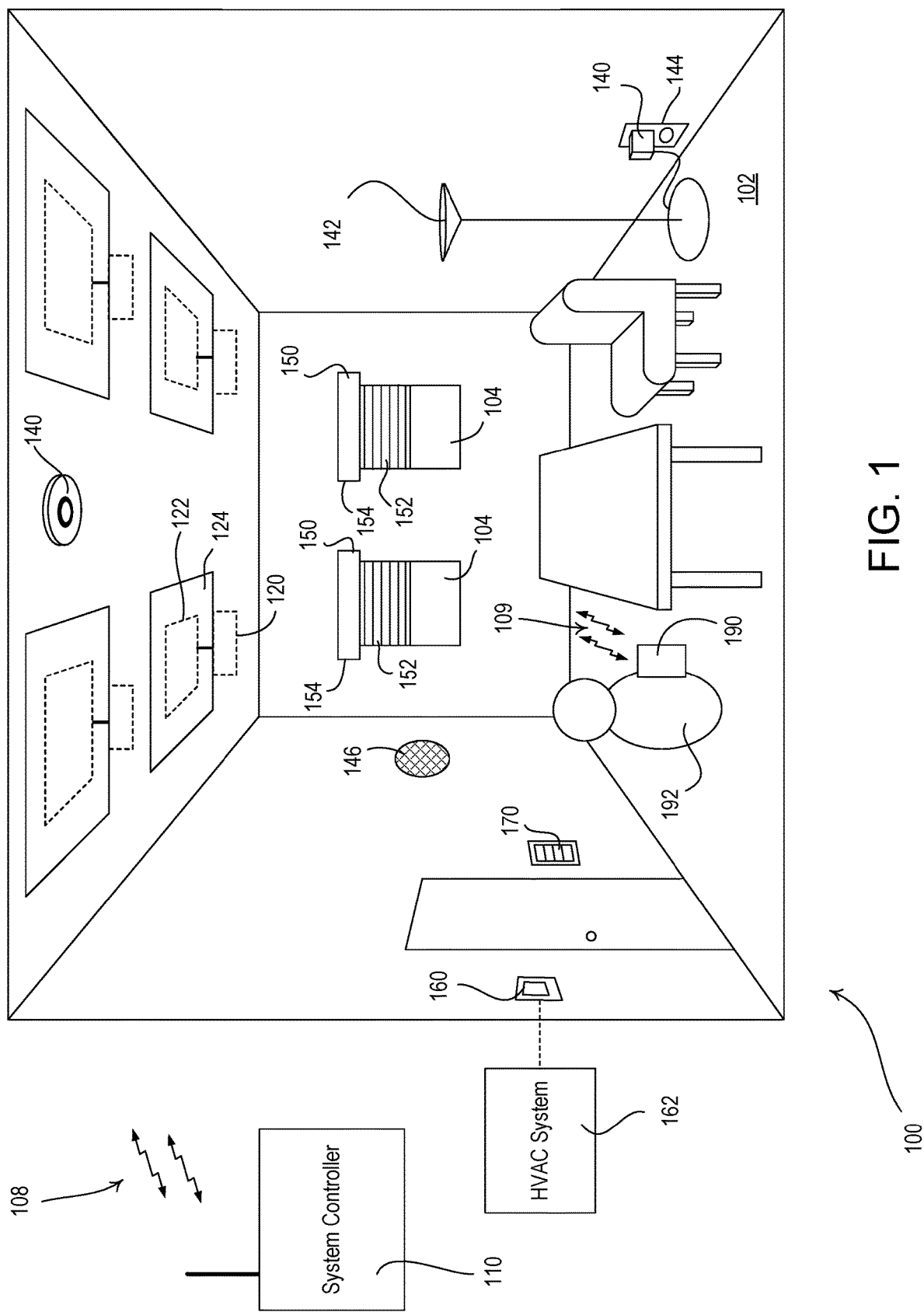
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) operable to communicate messages to and from the control devices (e.g., the control-source devices and/or the control-target devices). For example, the system controller 110 may be configured to receive messages from the control-source devices and transmit messages to the control-target devices in response to the messages received from the control-source devices. The control-source devices, control-target devices, and the system controller 110 may be configured to transmit and receive the RF signals 108 using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, BLUETOOTH, BLUETOOTH LOW ENERGY (BLE), ZIGBEE, Z-WAVE, THREAD, KNX-RF, ENOCEAN RADIO protocols, or a different proprietary protocol.

The load control system 100 may comprise one or more load control devices, e.g., a lighting control device 120, for controlling a lighting load, e.g., lighting loads 122 in a lighting fixture 124. For example, the lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive messages via the RF signals 108 (e.g., from the system controller 110) and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link).

The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 (e.g., from the system controller 110) and to turn on and off or adjust the intensity of the floor lamp 142 in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170 and/or the sensor device 140. The input devices may be fixed or movable input devices. The system controller 110 may be configured to transmit one or more messages to the load control devices (e.g., the lighting control device 120, the plug-in load control device 140, the motorized window treatments 150, and/or the thermostat 160) in response to the messages received from the remote control device 170. The remote control device 170 may be configured to transmit messages directly to the lighting control device 120, the plug-in load control device 140, the motorized window treatments 150, and/or the temperature control device 160.

The remote control device 170 may be configured to transmit messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol. The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., lighting control device 120, the plug-in load control device 140, the motorized window treatments 150, and/or the thermostat 160). The load control database may comprise association information that identifies associations between the load control devices and the input devices (e.g., the remote control device 170, etc.). The associations may comprise device identifiers that are stored together, such that devices may recognize the identifiers of associated devices to enable communication between the devices. Devices may recognize the stored identifiers of associated devices and communicate messages to and/or identify messages received from the associated devices. The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The control devices of the load control system may communicate with each other via a network. For example, the control devices may join the network by initiating a joining procedure. During the joining procedure, the control devices may send and receive joining messages, and the joining messages may be used to exchange credentials with a network commissioning device. After exchanging credentials, a control device may be provided with a network key, which may enable the control device to communicate over the network. The control devices may each then attempt to attach to another device (e.g., a router device) joined to the network, forming a mesh network. For example, a control device may attempt to attach to another device joined to the network by initiating an attachment procedure with the other device. As described herein, a control device may send and/or receive attachment messages to the other device on a network during the attachment procedure. And, based on the type of attachment message transmitted during an attachment procedure, the control device may establish a network link (e.g., parent-child link, auxiliary parent link, router-to-router link, or other single-hop communication link on the network) with the router device on the network. For example, the control device may transmit attachment messages configured to establish a parent-child link (e.g., parent-request messages and/or parent-response messages) during an attachment procedure to establish a parent-child link with the router device, such that the control device may become a child device of the router device and the router device may become a parent device of the control device. Similarly, the control device may transmit attachment messages configured to establish an auxiliary parent link (e.g., link-request messages and/or link-response messages) during an attachment procedure to establish an auxiliary parent link with the router device. After establishing a parent-child link, the control device may transmit and receive messages over the network through the other device. As described herein, the router device that a respective control device is attached to may be also be referred to as the parent device of the control device.

A control device may also attach to and establish network links with additional devices (e.g., router devices) joined to a network. For example, a control device may initiate an attachment procedure to attach to an additional router device (e.g., a router device that is not the parent device of the control device). As a result of the attachment procedure, the control device may establish an auxiliary parent link with the other router device, such that the other device becomes an auxiliary parent of the control device. And during the attachment procedure, for example, the control device may send and receive a number of attachment messages configured to establish an auxiliary parent link, such as link-request messages or link-response messages, to/from the other router device. Control devices may receive and process messages from the auxiliary parent devices that they are attached to (e.g., in addition to the parent device they are attached to), which may increase the reliability of the network information received in the network. As described herein, the process of control devices joining a network (e.g., via a joining procedure), and/or attaching to another device already joined to the network (e.g., via an attachment procedure) may be referred to as network formation.

During network formation, as described herein, a plurality of control devices may join a network and attach to other devices already joined to the network (e.g., via an attachment procedure with another device). The plurality of control may, however, each initiate their respective attachment procedures, which includes sending and receiving attachment messages over the network at the same or substantially the same time. As a result, multiple control devices may transmit attachment messages on the network at the same or substantially the same time. When multiple devices send messages over the network at the same or substantially the same time, the messages may collide with each other and/or result in the messages failing to be received. In addition, the collision of messages during network formation may delay the completion of network formation, which may also delay the installation and/or operation of a load control system.

As the scale of a network installation increases (e.g., the number of devices attached to the network), the number of collisions that occur during network formation may increase. In addition, after a device continually fails to attach to the network (e.g., as a result of message collisions and/or lack of connectivity with an already formed network), the device may attempt to form another network (e.g., a network partition). The network partitions may communicate in parallel with one another, but may not communicate with each other (e.g., at least for a period of time and/or until the network partitions combine into a single network partition). For example, the devices attached to a first network partition may not be able to communicate with the device attached to a second network partition. As network links are established between devices in a location, each network may grow and one or more devices in one network may join the other network. The devices that leave a network may cause undue processing delay for the devices that remain on the network, as the devices reconfigure or discover their roles in the network.

Figure 2A:
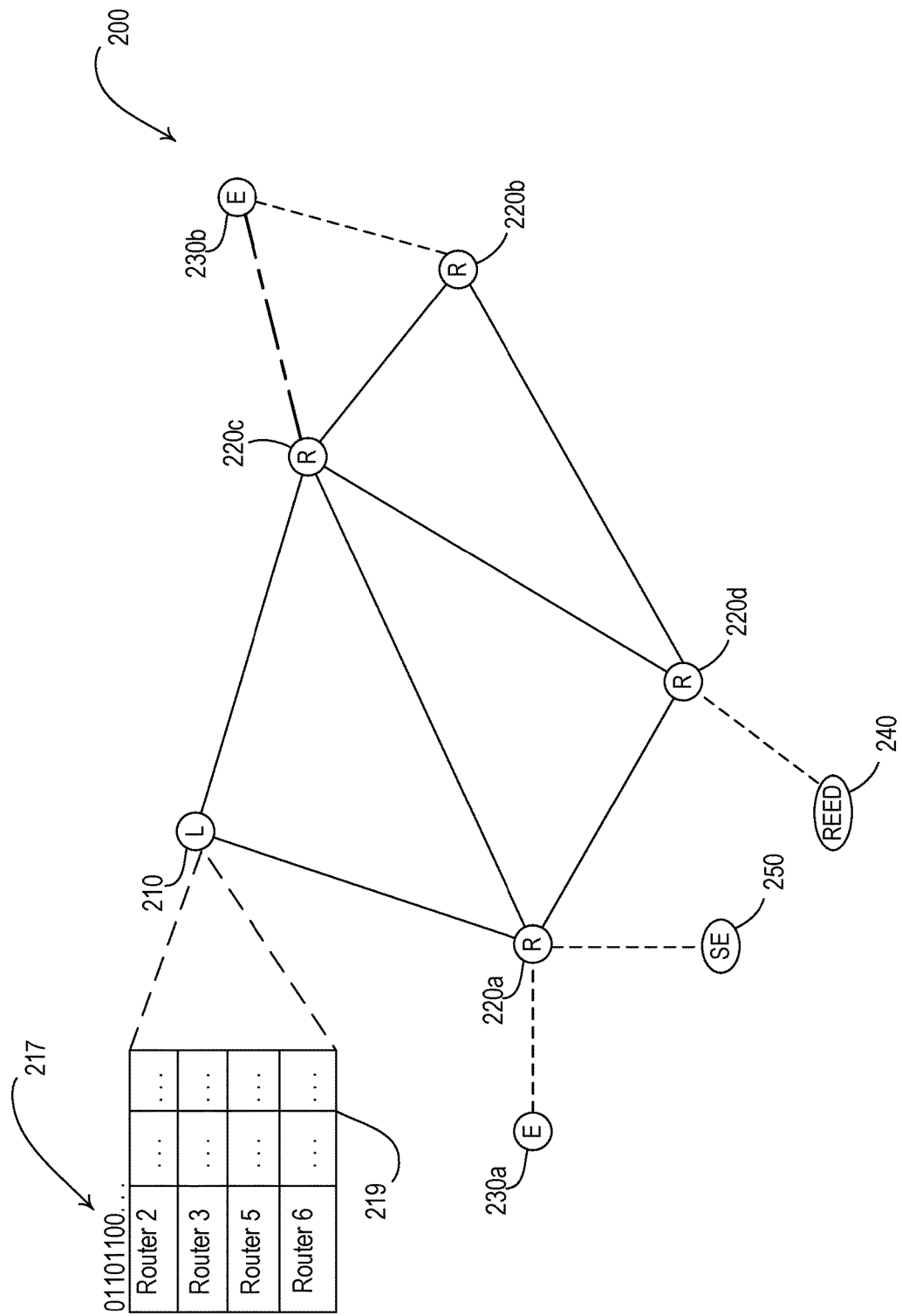
FIG. 2A is a diagram of an example network that may allow for communication between devices in the load control system of FIG. 1.

FIG. 2A is an illustration of an example network 200 that may allow for communication between control devices in a load control system (e.g., the load control system 100). The network 200 may include any suitable network to facilitate communications in a load control system. For example, the network 200 may be a mesh network on which control devices communicate using a mesh network wireless communication protocol (e.g., the THREAD protocol or other suitable protocol). The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more control devices or less control devices than the network 200.

The circled nodes of FIG. 2A may represent devices that are attached to other devices on the network 200 (e.g. the various control devices of the load control system 100). A control device that is attached to at least one other control device on the network 200 may communicate with the other control devices (e.g., that are attached to another control device on the network 200). Communication within the network 200 may be facilitated by the network links (e.g., attachments) established within the network 200. Referring to FIG. 2A, the network links between the devices may be indicated by lines (e.g., solid and dashed lines) that connect the respective control devices.

The control devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200. As described herein, end device may include and/or may be used to device end devices (e.g., end devices 230a and 230b), a router eligible end devices (e.g., router eligible end device 240), and/or a sleepy end devices (e.g., sleepy end device 250).

As illustrated in FIG. 2A, the network 200 may include a leader device 210 and one or more router devices 220a-220d. The leader device 210 may manage other control devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1, a system controller (e.g., the system controller 110 shown in FIG. 1) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices may be defined for the network 200). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another via network links (e.g., as indicated by the solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200 (e.g., the end devices 230a, 230b, the router eligible end device 240, and/or the sleepy end device 250). For example, the router devices 220a-220d may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as, the system controller 110, the dimmer switch 120, the LED driver 130, the plug-in load control device 140, the motorized window treatments 150, and/or the thermostat 160.

The network 200 may include one or more end devices 230a, 230b (e.g., full or minimal end devices). The end devices 230a, 230b may be attached to another device (e.g., a parent device, such as the leader device 210 and/or the router devices 220a, 220b, 220c, 220d) on the network 200 and may transmit and/or receive messages via its attached parent device (e.g., leader device and/or router device). Though two end devices 230a, 210b are shown in FIG. 2A, and each is attached to different router devices, each router device 220a-220d may support multiple end devices (e.g., more than 500 end devices). The system controller 110, input devices (e.g., the remote control device 170), and/or load control devices (e.g., the dimmer switch 120, the LED driver 130, the plug-in load control device 140, the motorized window treatments 150, and/or the thermostat 160) may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220d. As shown in FIG. 2A, the router eligible end device 240 may be one of the end devices that is attached to the router device 220d. The system controller 110, the dimmer switch 120, the LED driver 130, the plug-in load control device 140, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the dimmer switch 120, the LED driver 130, the plug-in load control device 140, the motorized window treatments 150, and/or the thermostat 160.

The network 200 may include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable their respective communication circuits in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery power devices may be examples of the sleepy end device 250.

The leader device 210 may update the roles (e.g., or confirm role updates) of the devices communicating within the network 200, for example, based on changes to the network 200. In an example, a control device may be assigned to a certain role when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The control devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is transmitting the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messaged, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device that the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device (e.g., primary parent device). A child device may also receive multicast messages (e.g. and/or broadcast messages) from its parent device (e.g., primary parent device) and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent device. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network link between two devices. As descried herein, messages may be communicated between devices that share a network link. In response to receiving the link request message, the router device 220c may transmit a message (referred to herein as a link accept message) to the end device 230b. The link accept request message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router may provide other router devices with the ability to measure a communication quality metric of the communication signal (e.g., RSSI) between the respective routers attached to the network (e.g., which the router devices may use to update their respective routing tables or routing information). As described herein, the child device may measure a received signal strength indicator (RSSI) of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the received signal strength (e.g., an RSSI) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the RSSI of messages received from each of the router devices in the router table. Also, or alternatively, child devices may maintain a generic router table. The router table may include each of the routers that a respective child device has received messages from and a received signal strength indicator for each of the respective router devices. The router table may also include an indication of whether a respective router device is a parent of the child device or an auxiliary parent of the child device. As used herein, the term auxiliary parent table may refer to a separate table from the router table or a subset of the router table that include the router devices that are synchronized auxiliary parents of the child device.

As described herein, the network 200 may allow for communication between devices in a load control system (e.g., the load control system 100 shown in FIG. 1). The end devices 230a, 230b may include load control devices (e.g., control-target devices) and/or input devices (e.g., control-source devices) that communicate with other devices in the load control system. For example, the end device 230a may communicate with another end device and/or a router device in the load control system via RF communications.

Referring to FIG. 1, the remote control device 170 may operate as an end device or a sleepy end device for communicating messages comprising indications of user input and/or control instructions for controlling another end device (e.g., the dimmer switch 120, the LED driver 130, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices the network to route the messages to the other end device (e.g., the dimmer switch 120, the LED driver 130, the plug-in load control device 140, the motorized window treatment 150, and/or the thermostat 160) for performing load control.

A control device may attach to another control device on a network or network partition (e.g., the network 200 shown in FIG. 2A) to enable the device to communicate (e.g., transmit and/or receive messages) via the network. A control device may initiate attachment to another control device on a network by transmitting a parent request message (e.g., a multicast parent request message) to discover potential parent devices. A parent request message may be transmitted by a control device to discover and/or attach to a parent device (e.g., router devices and/or leader devices). A control device may transmit the parent request message as a multicast message, for example, to identify devices that are attached to a network that can act as a parent device of the control device.

Figure 2B:
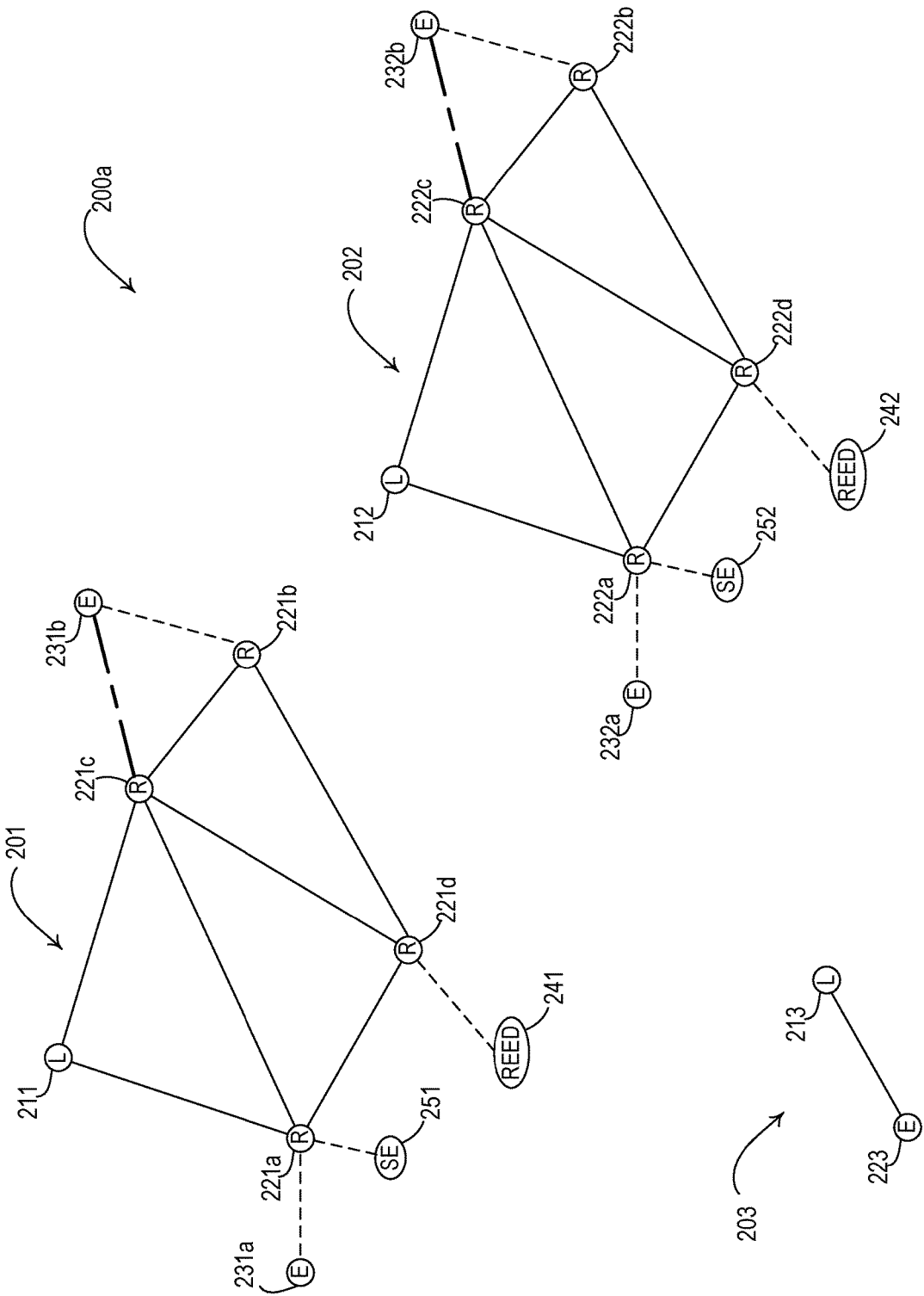
FIG. 2B is a diagram of example networks or network partitions (e.g., networks or subnetworks) that allow for communication between devices in the load control system of FIG. 1.

FIG. 2B is an example illustration of a network 200a having a plurality of network partitions 201, 202, 203 (e.g., separate network partitions). As illustrated in FIG. 2B, the network partition 201 may include the following parent devices: a leader device 211 and router devices 221a, 221b, 221c, 221d. In addition, the network 201 may include child devices, such as: end devices 231a, 231b; router eligible end device 241; and sleepy end device 251. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between control devices in a load control system (e.g., the load control system 100). In addition, the network partitions 201, 202, 203 may be formed as a result of certain control devices being unable for attach to an already formed network partition. For example, as described herein, a control device may attempt to attach to another control device on a network partition by transmitting a parent request message (e.g., a multicast parent request message). If, however, the control device fails to receive a response to the parent request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network partition 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). A higher or lower partition identifier may indicate a higher priority value for the network partition priority (e.g. then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a device in a network partition may be unable to transmit messages to control devices attached to another network partition (e.g., a device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the router devices attached the respective network (e.g., a summation of the communication range of each of the router devices attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive an advertisement message from a device attached to the network partition 201 (e.g., from the router device 221d). The advertisement message may include an indication of the partition identifier of the network 201 (e.g., 3) may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. For example, as the child devices communicate with the router device 222a using the router identifier. If the router device 222a is assigned the requested identifier by the leader device 211 of the network partition 201 (e.g., the router identifier as assigned in the network partition 202), the child devices may continue to communicate with router device 222a using the same router identifier.

Figure 2D:
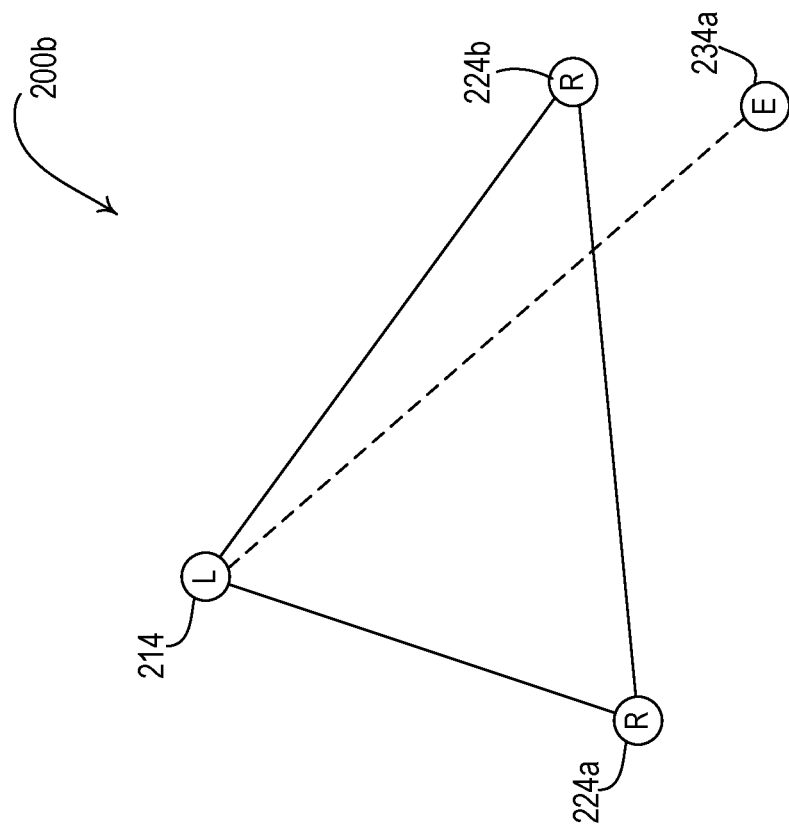
FIGS. 2C and 2D are diagrams of another example network that allows for communication between devices in the load control system of FIG. 1.
Figure 2C:
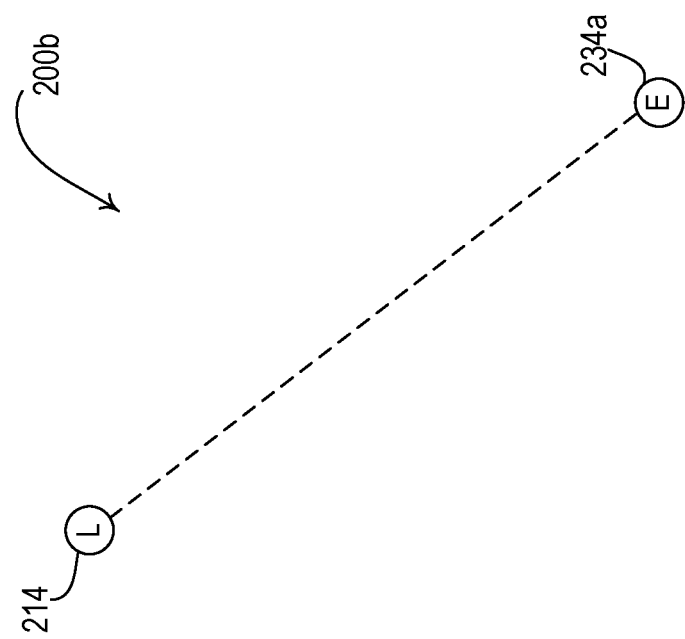

FIGS. 2C and 2D are illustrations of an example network 200b as the network 200b advances or progresses in network formation. As illustrated in FIG. 2C, the network 200b may include a leader device 214 and an end device 234a. As the network 200" is in the initial stages of network formation, the network 200b may not yet include a router device. The end device 234a may, as a result, attach to the leader device 214 (e.g., as other router devices not yet exist on the network 200b). However, the network link (e.g., the parent/child link) between the leader device 214 and the end device 234a may be weak (e.g., the received signal strength indicator of messages received by the end device 234a may be approximately −60 dB). For example, the network link between the leader device 214 and the end device 234a may be weak because the leader device 214 and the end device 234a are not proximately positioned to each other. If the network link between the leader device 214 and the end device 234a is weak, the likelihood of message transmission and/or reception failures between the leader device 214 and the end device 234a may increase.

FIG. 2D illustrates the network 200b during a later stage of network formation than the stage of network formation illustrated in FIG. 2C. As illustrated in FIG. 2D, the network 200b may grow to include additional control devices as network formation advances (e.g., as time progresses). For example, the network 200b may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential network links (e.g., potential parent/child links) between the router devices 224a, 224b and the end device 234a may be stronger than the network link between the leader device 214 and the end device 234a. Moreover, as illustrated in FIG. 2D, a potential network link between the router device 224b and the end device 234a may be stronger than a potential network link between the router device 224a and the end device 234a (e.g., as the router device 224b is positioned closer to the end device 234a than the router device 224a).

As network formation progresses or advances additional devices attach to the network. As a result, the end device 234a may experience better communication over the network 200b if the end device 234a determines to detach from an initial parent device (e.g., the leader device 214) and to attach to an updated parent device (e.g., the router device 224a or the router device 224b). For example, as described herein, the updated parent device may be positioned to closer to the end device 234a than the initial parent device (e.g., such that the updated parent device and the end device 234a may have a stronger network link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the network link shared between two devices, other conditions may affect the network link shared between two devices (e.g., line of sight, interference, signal obstructions, etc.). To that extent, the scenarios of FIGS. 2C and 2D are merely examples to illustrate that a network may change of over time and that changes to network may be considered in attempts to increase communications over the network.

Figure 2E:
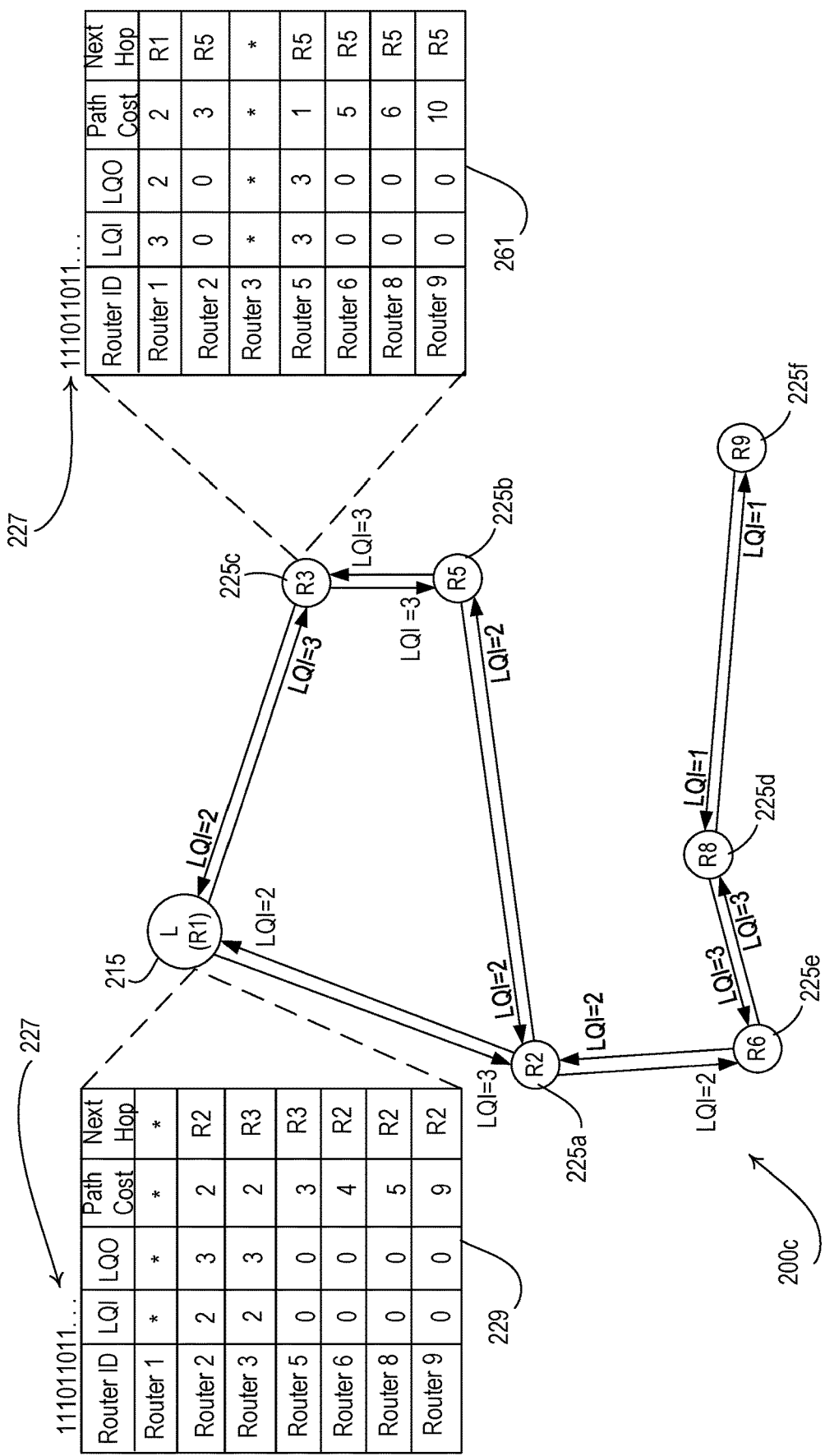
FIG. 2E is a diagram of another example network that illustrates the cost and network overhead associated with communication between the devices in the load control system of FIG. 1.

FIG. 2E is an illustration of an example network 200c. As illustrated in FIG. 2E, the network 200c may include a leader device 215 and router devices 225a, 225b, 225c, 225d, 225e, 225f. In the network 200c, the router devices (e.g., the leader device 215 and router devices 225a, 225b, 225c, 225d, 225e, 225f) may periodically transmit advertisement messages that may be used for calculating cost and/or quality communications in the network 200c. For example, router device 225c may send an advertisement message that is received by leader device 215, and leader device 215 may send an advertisement message that is received by the router device 225c. Each router device may measure the received signal strength indicator (RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop communication link with the router device transmitting the advertisement messages. A single-hop communication link may be capable of communicating messages (e.g., messages) from a router device via a unicast and/or multicast communication directly to another router device. For example, the router devices 225a, 225c may be neighboring devices that share a single-hop communication link with the leader device 215, as the router devices 225a, 225c are capable of sending messages directly to and/or receiving messages directly from the leader device 215. The single-hop communication link may be a network link on which router devices may be capable of directly receiving the advertisement messages above a given link quality (e.g., LQI greater than 0).

After a router device receives a periodic advertisement message from another router device, the router device may calculate the link quality (e.g., LQI) of the network link via which the advertisement message is received. The LQI may be calculated as a predefined number that is within a range indicating different link qualities for the network link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a network link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a network link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a network link with a neighboring router device when the RSSI value of one or more advertisement messages (e.g., average RSSI value for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for network links between neighboring routing devices.

The LQI of the network links measured locally at each control device (e.g., the leader device 215 and the router device 225c) may be exchanged with the other device on the network link. For example, the LQI may be measured locally at each control device and transmitted to the other device via an advertisement message. The LQI that is measured by another router device (e.g., on the other side of the network link) and received at a router device may be stored as the link quality out (LQO) for the network link. The LQI and/or the LQO may be stored in a local router table at each routing device. For example, the leader device 215 may store the LQI and/or the LQO for the network link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the network link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a network link with other router devices. The link quality for the network link between the two router devices may be the lesser of the value of the link quality for messages being transmitted out (e.g., LQO) and the value of the link quality for messages being received (e.g., LQI) on a single-hop communication link between two devices. An LQO or an LQI of zero may indicate that the router device fails to have a direct network link with the router device listed in the router table. A link cost for sending communications between devices on a network link may correspond directly to the link quality of communications on the network link. The link cost may indicate a relative cost or loss of communications on the network link. FIG. 2F is an example table 262 that illustrates example link costs that may correspond to different link qualities. As shown in FIG. 2F, a greater link quality may correspond to a lower link cost for communications on the network link between two neighboring devices. The link cost for each network link may be used by a router device to calculate a path cost for communications between the router device and another device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages. The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop communication link as being equal to the link cost and store the path cost in the locally-stored router table. For example, the router device 225c may set the path cost for communications with the leader device 215 equal to the link cost (e.g., lower of LQI and LQO) on the network link and store the path cost in the router table 261. Similarly, the router device 225c may set the path cost for communications with the router device 225b equal to the link cost (e.g., lower of LQI and LQO) on network link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225b may be unable to directly communicate with the leader device 215, the router device 225b may receive path cost information for communicating messages through another router in the network 200c. The router 225c may transmit the path cost for communicating messages to/from the leader device 215 (e.g., path cost=2) in a multicast message that is received by other router devices. The multicast message may be an advertisement message, for example. The router device 225b may receive the path cost for communicating messages between the leader device 215 and the router device 225c (e.g., path cost=2). To calculate the total path cost for communicating messages between the router device 225b and the leader device 215 through the router device 225c, the router device 225b may add the link cost for communications between the router device 225b and the router device 225c (e.g., link cost=1) to the path cost received from the router device 225c (e.g., path cost=1) to get a total path cost (e.g., path cost=3). The link cost for communications between the router device 225b and the router device 225c may be determined from the link quality of the network link between the router device 225b and the router device 225c, which may be the smaller of the LQI and LQO of the network link (e.g., link quality=3).

Each router device may send/broadcast an advertisement message that includes the path cost to one or more other router devices in the network 200c. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225b to the leader device 215 may be communicated through the router device 225a or the router device 225c. The router device 225b may receive respective advertisement messages from the router device 225a and the router device 225c that indicate the path cost for communication of messages between the router device 225a and the leader device 215 is the same as the path cost for communication of messages between the router device 225c and the leader device 215 (e.g., path cost=2 on each network link). The router device 225b may add the link cost calculated for communicating messages between the router device 225b and the router device 225c (e.g., link cost=1) to the path cost information received in the advertisement message from the router 225c (e.g., path cost=2) to determine the total path cost for communicating with the leader device 215 through the router device 225c (e.g., total path cost=3). The router device 225b may similarly add the link cost calculated for communicating messages between the router 225b and the router 225a (e.g., link cost=2) to the path cost information received in the advertisement message from the router 225a (e.g., path cost=2) to determine the total path cost for communicating with the leader device 215 through the router device 225a (e.g., total path cost=4). The router device 225b may update a locally-stored router table with the lowest calculated path cost for communicating with the leader device 215 and/or the identifier of the router device through which messages are to be transmitted (e.g., router 225c). Each router device may similarly update their respective locally-stored router table with the lowest calculated path cost for communicating with the other router devices in the network 200c. For example, as shown in FIG. 2E, the leader device 215 and the router device 225c may each calculate the lowest path cost for communicating to other router devices in the network 200c and store the path cost in the respective router tables 229, 261. The router tables 229, 261 may also have stored therein the router identifier of the next hop from the respective devices 215, 225c through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200c. The router device may use the best communication path (e.g., lowest cost path) for communicating messages to another device. This routing mechanism may allow router devices to detect when other router devices have dropped off the network 200c, or a path cost between routers has changed, and calculate the next lowest cost path to maintain connectivity to other router devices in the network 200c.

The link quality information may be used when forming the network (e.g., the networks 200, 200a, 200b, 200c). Each control device may be configured to determine one or more link quality thresholds $TH_{LQ1}$-$TH_{LQ3}$ for use when attaching to other control devices (e.g., router devices) on the network. When attempting to attach to another device (e.g., to form a relationship with a parent device), the control device operating as an end device may transmit a parent request message and receive responses to the parent request message from one or more router devices. The control device may compare the received signal strength indicators of the received responses (e.g., parent response) of the parent request message to one or more of the link quality thresholds $TH_{LQ1}$-$TH_{LQ3}$, and may choose to attach to one of the router devices if the respective received signal strength indicator exceeds one of the link quality thresholds $TH_{LQ1}$-$TH_{LQ3}$. In addition, the control device may determine link qualities between the control device and each of the router devices that transmitted responses to the parent request message, and choose to attach to one of the router devices based on the determined link qualities.

The control devices may be configured to calculate the link quality thresholds $TH_{LQ1}$-$TH_{LQ3}$, for example, using the noise floor value NF. As described herein, the link quality or link quality indicator may be used as a communication quality metric that indicates a quality of communications on a network link. Additionally, or alternatively, the communication quality metric may include or be calculated from an RSSI value, a link margin, and/or a signal-to-noise ratio value (SNR). The signal-to-noise ratio value may be a signal-to-noise ratio or a value related to or indicating the signal-to-noise ratio. The link margin and/or the signal-to-noise ratio value may be calculated from a noise floor value NF to indicate a relative quality of communications from the noise floor. The noise floor value NF may be calculated as an average value of the radio-frequency energy (e.g., background RF energy) received by the control device when the control device is not presently receiving a message via the RF signals. Whenever the control device is not presently receiving a message, the control device may determine or measure a background communication quality metric value of the radio-frequency energy received by the control device and use the background communication quality metric value of the radio-frequency energy to calculate one or more link quality thresholds. The control device may average the background communication quality metric values received over time to determine the noise floor value NF. For example, the noise floor value NF may be calculated as a ten-second average of the background RSSI values taken at a 250 millisecond interval. The control device may then calculate the link quality thresholds $TH_{LQ1}$-$TH_{LQ3}$ by adding respective link margins to the noise floor, e.g., $TH_{LQ1}$=NF+2 dB;

$TH_{LQ2}$=NF+10 dB; and $TH_{LQ3}$=NF+20 dB.

Each of the link quality thresholds may correspond to the different link qualities or link quality indicators described herein (e.g., as illustrated in FIG. 2F) and may be used to determine a corresponding link cost. In an example, the link quality threshold $TH_{LQ3}$ may correspond to a network link having the highest link quality (e.g., link quality equal to three) and/or lowest link cost (e.g., link cost equal to one). The link quality threshold $TH_{LQ3}$ may be used to define a primary network link. The link quality threshold $TH_{LQ2}$ may correspond to a secondary network link or a network link have a relatively lower link quality (e.g., link quality equal to two) and/or higher link cost (e.g., link cost equal to two). The link quality threshold $TH_{LQ2}$ may be used to define a secondary network link. The link quality threshold $TH_{LQ1}$ may correspond to a tertiary network link or a network link have a lowest link quality (e.g., link quality equal to one) and/or highest link cost (e.g., link cost equal to three). The link quality threshold $TH_{LQ1}$ may be used to define a primary network link. The control device may store the link quality thresholds $TH_{LQ1}$-$TH_{LQ3}$ in memory for use when attempting to attach to another device during a subsequent attachment procedure. During network formation a control device may attach to another control device that is assigned the role of router device in the network so long as there is at least one router device having a link quality equal to three. If there is not at least one router device having a link quality equal to three available among the control devices currently assigned as router devices, the control device may seek to upgrade a control device to the role of router device. Though three link quality thresholds are described herein, another number of link quality thresholds may be implemented to show different levels of link quality and/or corresponding link cost.

The control device may also be configured to determine the link quality thresholds $TH_{LQ1}$-$TH_{LQ3}$ using a percentile floor link qualification procedure. When the control device is not presently receiving a message, the control device may periodically determine (e.g., measure) a background RSSI value of the radio-frequency energy received by the control device and set the link quality 3 threshold $TH_{LQ3}$ to the $N^{th}$ percentile value of the background RSSI values. To set the link quality 3 threshold $TH_{LQ3}$ to the $N^{th}$ percentile value of the background RSSI values, the control device may increase the link quality 3 threshold $TH_{LQ3}$ by a first amount (e.g., an increment x) when a measured background RSSI value exceeds the link quality 3 threshold $TH_{LQ3}$, and decrease the link quality 3 threshold $TH_{LQ3}$ by a second amount (e.g., a decrement y) when a measured background RSSI value does not exceed the link quality 3 threshold $TH_{LQ3}$. The resulting value of the link quality 3 threshold $TH_{LQ3}$ may approximate the $N^{th}$ percentile value of the background RSSI values, where N is dependent upon the values of the increment x and the decrement y, e.g., $N=(x/(x+y))\cdot 100$. For example, to set the link quality 3 threshold $TH_{LQ3}$ to the $95^{th}$ percentile value of the background RSSI values, the increment x may be set to 0.95 dB and the decrement y may be set to 0.05 dB. The other link quality thresholds $TH_{LQ2}$ and $TH_{LQ1}$ may be set based on the determined link quality 3 threshold $TH_{LQ3}$, e.g., $TH_{LQ1}$=$TH_{LQ3}$-$z_1$; and $TH_{LQ2}$=$TH_{LQ3}$-$z_2$, where offsets $z_1$ and $z_2$ are constants and may be, for example, 30 dB and 10 dB, respectively. When using the percentile floor link qualification procedure, the noise floor value may be 30 dB below the link quality 3 threshold $TH_{LQ3}$ and may be equal to the link quality 1 threshold $TH_{LQ1}$. The noise floor value NF may be set to a value below the link quality 1 threshold $TH_{LQ1}$ and may be set based on the determined link quality 3 threshold $TH_{LQ3}$, e.g., NF=$TH_{LQ3}$-$z_3$, where offset $z_3$ is a constant that may be equal to offsets $z_1$, or may be set to a larger value such that the noise floor value NF is below $TH_{LQ1}$.

Figure 3A:
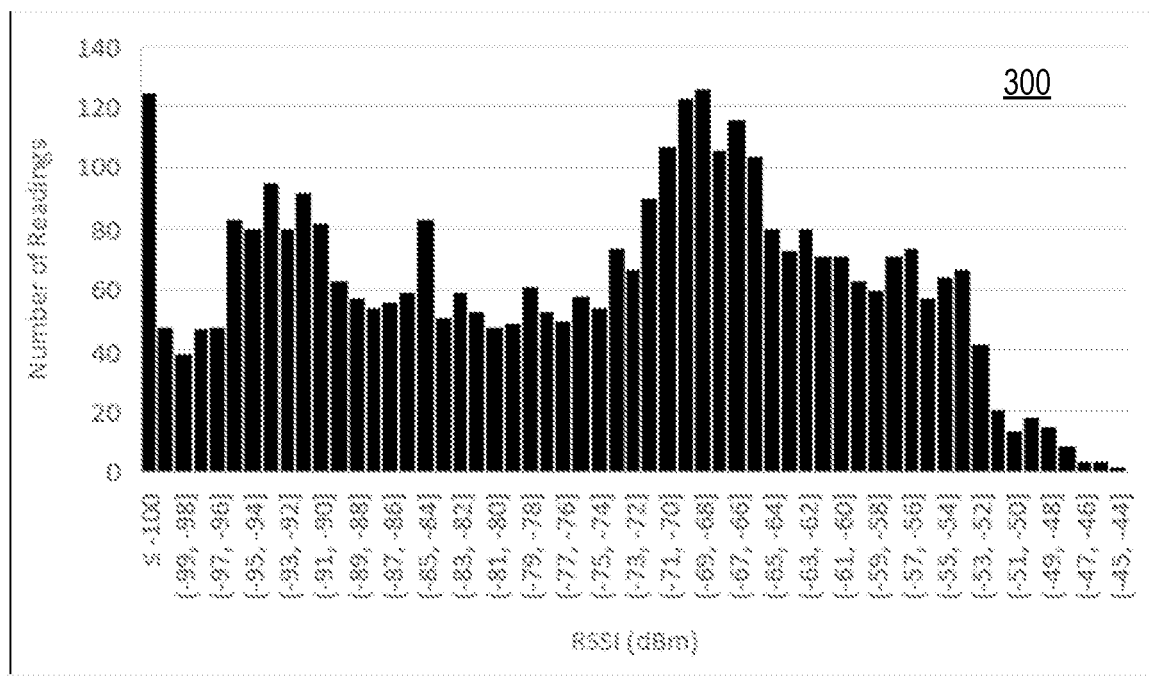
FIGS. 3A and 3B illustrate histograms showing numbers of measurements (e.g., readings) of different background received signal strength indicator values recorded by control devices on a network over a period of time.
Figure 3B:
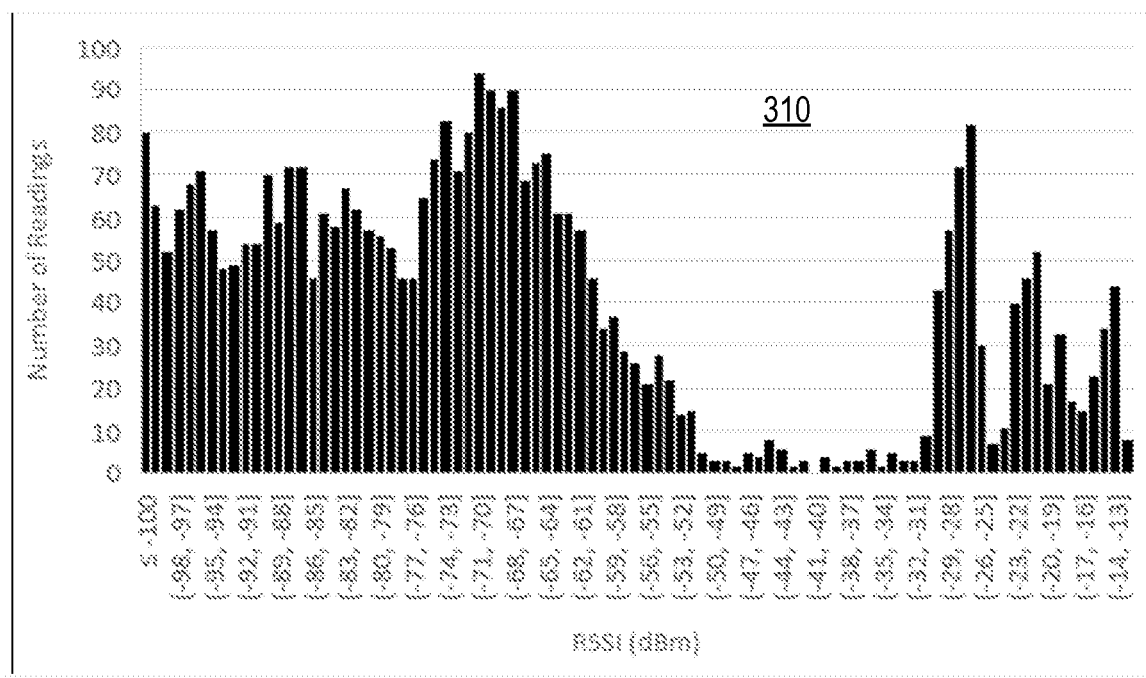

FIGS. 3A and 3B illustrate histograms 300, 310 showing numbers of measurements (e.g., readings) of different background RSSI values recorded by control devices on a network over a period of time. The histogram 300 in FIG. 3A may illustrate the number of measurements of various background RSSI values recorded by a first control device that may be located in an environment where the network is experiencing an average amount of wireless communication traffic (e.g., an average-noise environment). As shown in FIG. 3A, the measurements of background RSSI values for the first control device may range up to an RSSI value of approximately −50 to −44 dB, which may represent RF energy generated by the control devices connected to the network as well as other wireless transmitters in the vicinity of the first control device.

The histogram 310 in FIG. 3B may illustrate the number of measurements of various background RSSI values recorded by a second control device that may be located in an environment where the network is experiencing a higher amount of wireless communication traffic (e.g., a high-noise environment). For example, the second control device may be located near a noise-generating source (e.g., a sporadic, but loud noise-generating source), such as a wireless access point (WAP) or a microwave oven. A large portion of the measurements of background RSSI values for the second control device may range up to an RSSI value of approximately −54 to −44 dB, which may represent RF energy generated by the control devices connected to the network as well as other typical wireless transmitters in the vicinity of the second control device (e.g., similar to the histogram 300 for the first control device). However, as shown in FIG. 3B, the second control device may also record background RSSI values in the range of approximately −31 to −13 dB, which may represent RF energy generated by a noise source.

Figure 4A:
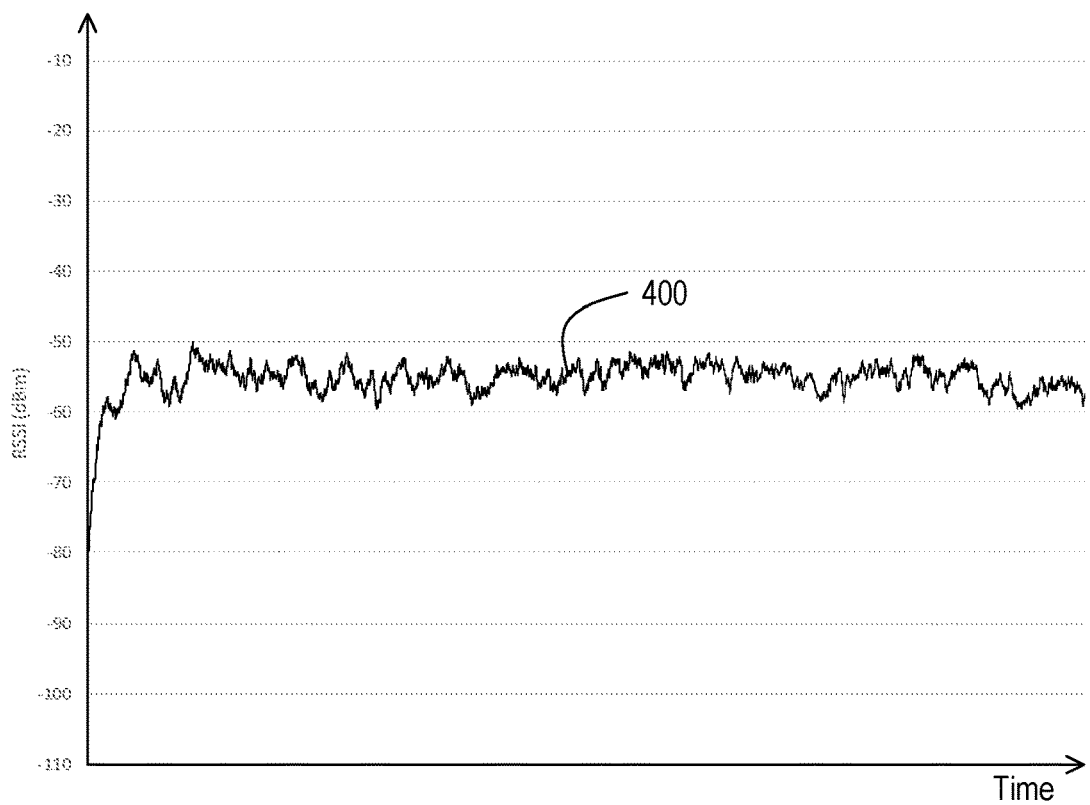
FIGS. 4A and 4B illustrate values of link quality thresholds of control devices on a network with respect to time, where the link quality thresholds may be determined using an averaging procedure.
Figure 4B:
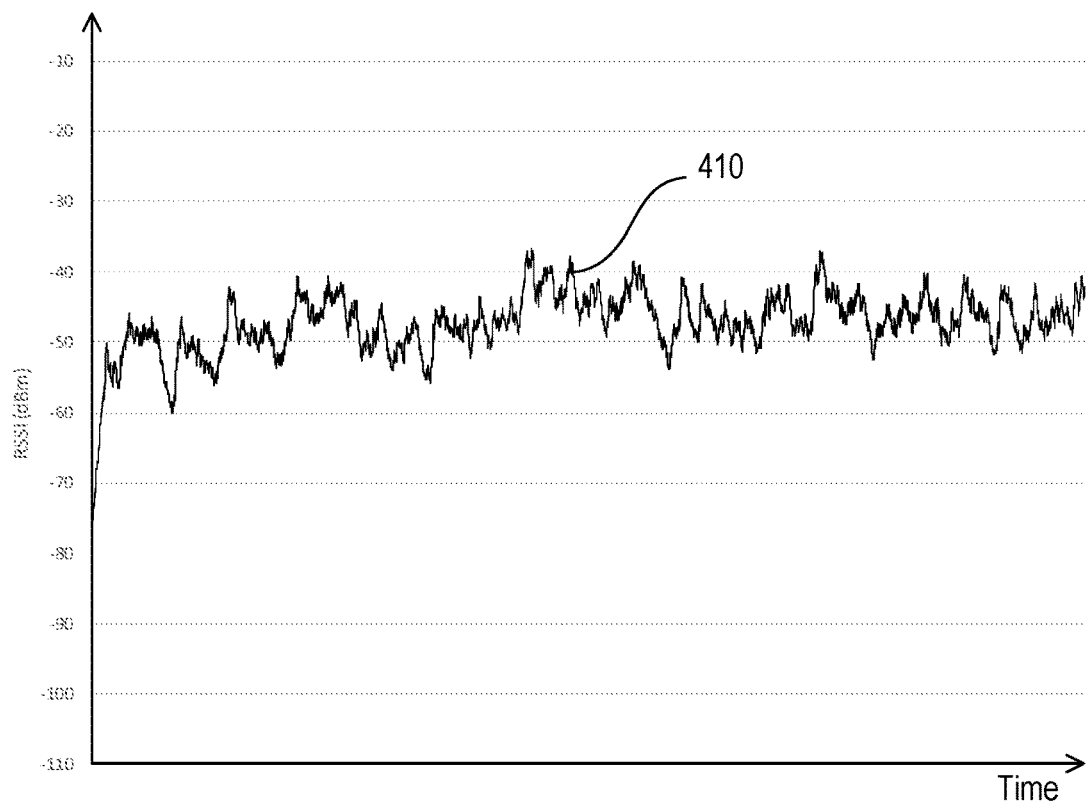

FIGS. 4A and 4B illustrate values of link quality thresholds of control devices on a network with respect to time, where the link quality thresholds may be determined using the averaging procedure. FIG. 4A illustrates a plot 400 of a link quality 3 threshold $TH_{LQ3}$ of a first control device that may be an end device located in an environment where the network is experiencing an average amount of wireless communication traffic (e.g., the first control device from the discussion of FIG. 3A). FIG. 4B illustrates a plot 410 of a link quality 3 threshold $TH_{LQ3}$ of a second control device that may be an end device located in an environment where the network is experiencing a higher amount of wireless communication traffic (e.g., the second control device from the discussion of FIG. 3B). The link quality 3 thresholds $TH_{LQ3}$ shown in FIGS. 4A and 4B may be determined based on (e.g., offset from) a noise floor value NF that may be calculated as an average of the background RSSI values (e.g., a ten-second average of the background RSSI values taken at a 250 millisecond interval).

The values of the link quality 3 threshold $TH_{LQ3}$ of the first control device in the average-noise environment may be in the range of approximately −58 to −50 dB over time. The values of the link quality 3 threshold $TH_{LQ3}$ of the second control device in the higher-noise environment may be higher than the values of the link quality 3 threshold $TH_{LQ3}$ of the first control device, for example, in the range of approximately −55 to −38 dB over time. Since the second control device in the higher-noise environment may be located near an intermittent, but relatively loud, noise-generating source, the values of link quality 3 threshold $TH_{LQ3}$ of the second control device may be more sporadic over time than the values of the link quality 3 threshold $TH_{LQ3}$ of the first control device. The first and second control devices may use the respective link quality 3 thresholds $TH_{LQ3}$ to determine the router devices to which to attach. Since the values of the link quality 3 threshold $TH_{LQ3}$ of the second control device are slightly higher than the link quality 3 threshold $TH_{LQ3}$ of the first control device, the first and second control devices may use similar values of the link quality 3 threshold $TH_{LQ3}$ when attaching to parent device in the average-noise environment and high-noise environment. As a result, the first control device in the average-noise environment may create a relatively strong network link with a parent device, while the second control device in the higher-noise environment may create a relatively weak network link with a parent device that may be susceptible to collisions, dropped messages, and other communication errors when the noise-generating source is transmitting signals.

Figure 5A:
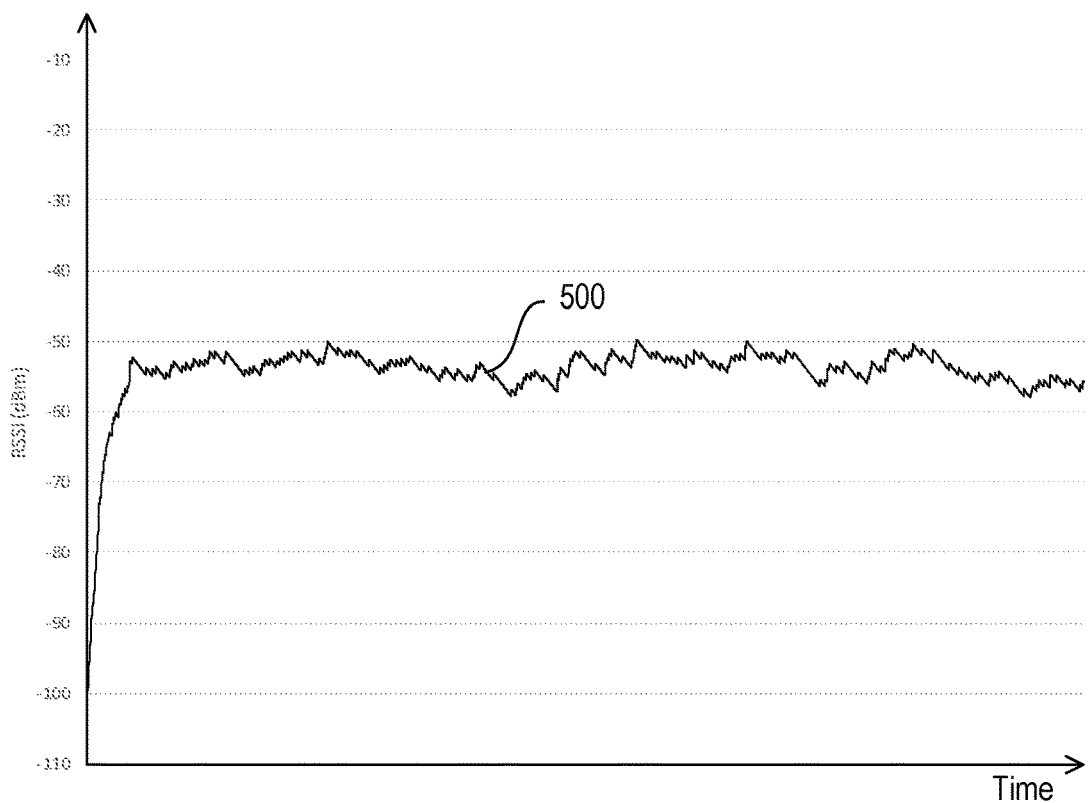
FIGS. 5A and 5B illustrate values of link quality thresholds of control devices on a network with respect to time, where the link quality thresholds may be determined using a percentile floor link qualification procedure.
Figure 5B:
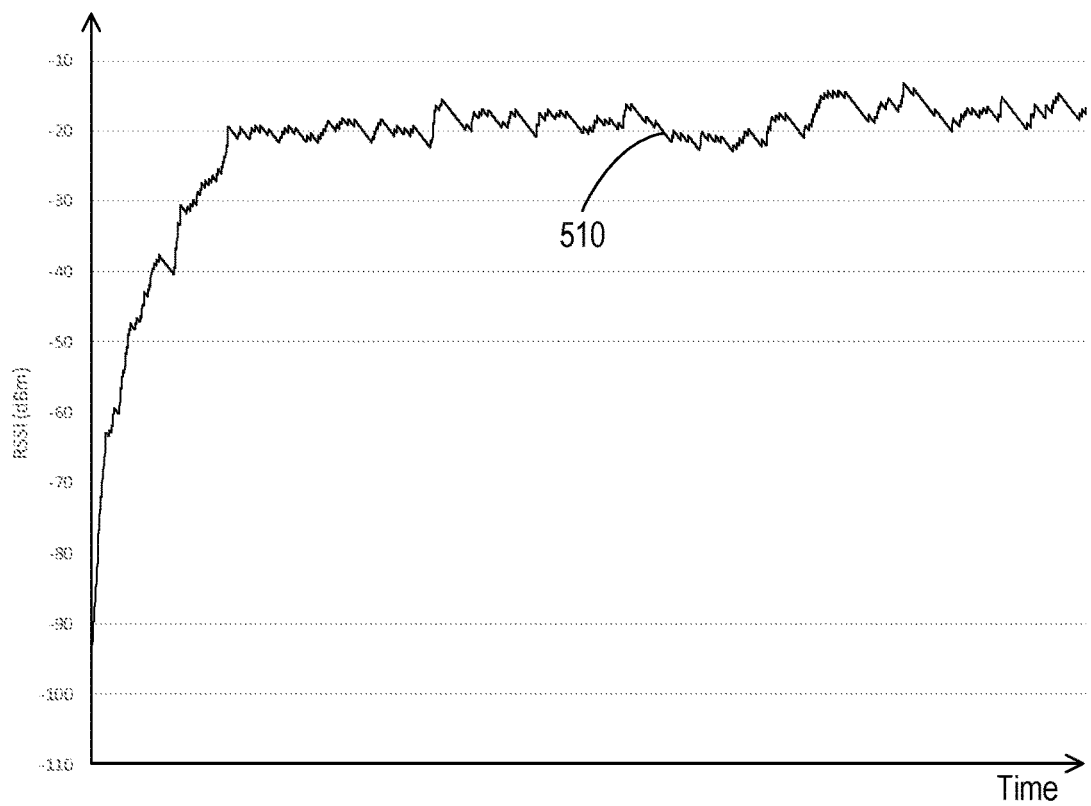

FIGS. 5A and 5B illustrate values of link quality thresholds of control devices on a network with respect to time, where the link quality thresholds may be determined using a percentile floor link qualification procedure. FIG. 5A illustrates a plot 500 of a link quality 3 threshold $TH_{LQ3}$ of a first control device that may be an end device located in an environment where the network is experiencing an average amount of wireless communication traffic (e.g., the first control device from the discussion of FIG. 3A). FIG. 5B illustrates a plot 510 of a link quality 3 threshold $TH_{LQ3}$ of a second control device that may be an end device located in an environment where the network is experiencing a higher amount of wireless communication traffic (e.g., the second control device from the discussion of FIG. 3B). The link quality 3 thresholds $TH_{LQ3}$ shown in FIGS. 5A and 5B may be determined based on a percentile floor link qualification procedure. For example, the link quality 3 thresholds $TH_{LQ3}$ shown in FIGS. 5A and 5B may be equal to the $95^{th}$ percentile value of background RSSI values recorded by the first and second devices.

The values of the link quality 3 threshold $TH_{LQ3}$ of the first control device in the average-noise environment may be in the range of approximately −57 to −50 dB over time. The values of the link quality 3 threshold $TH_{LQ3}$ of the second control device in the higher-noise environment may be higher than the values of the link quality 3 threshold $TH_{LQ3}$ of the first control device, for example, in the range of approximately −23 to −14 dB over time. As previously mentioned, the first and second control devices may use the respective link quality 3 thresholds $TH_{LQ3}$ to determine the router devices to which to attach. The values of the link quality 3 threshold $TH_{LQ3}$ of the first control device in the average-noise environment as shown in FIG. 5A are approximately equal to the largest background RSSI values shown in the histogram 300 of FIG. 3A. As a result, the first control device in the average-noise environment may be configured to create a relatively strong network link with a parent device. The values of the link quality 3 threshold $TH_{LQ3}$ of the second control device in the higher-noise environment as shown in FIG. 5B are approximately equal to the high end of the range of background RSSI values representing the RF energy generated by a noise-generating source as shown in the histogram 3B of FIG. 3B. As a result, the second control device in the higher-noise environment may also be configured create a relatively strong network link with a parent device (e.g., as will be described in greater detail below).

In the average-noise environment, the values of the link quality 3 threshold $TH_{LQ3}$ determined using the averaging procedure (e.g., as shown in FIG. 4A) may be similar to the values of the link quality 3 threshold $TH_{LQ3}$ determined using the percentile floor link qualification procedure (e.g., as shown in FIG. 5A). However, in the higher-noise environment (e.g., when a control device is located near a noise-generating source), the values of the link quality 3 threshold $TH_{LQ3}$ determined using the percentile floor link qualification procedure (e.g., as shown in FIG. 5B) may be relatively larger than the values of the link quality 3 threshold $TH_{LQ3}$ determined using the averaging procedure (e.g., as shown in FIG. 4B). As such, a control device using the percentile floor link qualification procedure may generate relatively stronger network links with parent devices than a control device using the averaging procedure to determine the link quality thresholds when located in a high-noise environment. For example, a control device using a link quality 3 threshold $TH_{LQ3}$ determined using the averaging procedure may choose to attach to a parent device from which received signals have received signal strength indicators that are less than the value of a link quality 3 threshold $TH_{LQ3}$ determined using the percentile floor link qualification procedure in the higher-noise environment. The resulting network link may be susceptible to communication errors, particularly when the noise-generating source is transmitting signals.

However, a control device using a link quality 3 threshold $TH_{LQ3}$ determined using the percentile floor link qualification procedure in a high-noise environment may be more restrictive in choosing a router device to which to attach than if the control device was using a link quality 3 threshold $TH_{LQ3}$ determined using the averaging procedure. The control device may not choose to attach to a parent device from which received signals have received signal strength indicators that are less than the link quality 3 threshold $TH_{LQ3}$ determined using the percentile floor link qualification procedure. The control device may request that router-eligible end devices (REEDs) from which the signals are received having received signal strength indicators that are greater than the link quality 3 threshold $TH_{LQ3}$ upgrade to become router devices, and then attach to at least one of the former router-eligible end devices that upgraded to a router device. As a result, the network may form with more router devices located in higher-noise environments (e.g., in the vicinity of noise-generating sources) to ensure that the control devices in the higher-noise environment are able to communicate with control devices in other areas.

Figure 6:
FIG. 6 is an enlarged view of plots of link quality thresholds determined using an averaging procedure and a percentile floor link qualification procedure in a high-noise environment.

FIG. 6 is an enlarged view of plots 600, 610 of link quality thresholds determined by a control device operating as an end device using the averaging procedure and the percentile floor link qualification procedure in a higher-noise environment. The first plot 600 may illustrate values of a link quality 3 threshold $TH_{LQ3}$ that may be determined using the averaging procedure (e.g., and may be an enlarged portion of the plot 410 as shown in FIG. 4B). The second plot 610 may illustrate values of a link quality 3 threshold $TH_{LQ3}$ that may be determined using a percentile floor link qualification procedure (e.g., and may be an enlarged portion of the plot 510 as shown in FIG. 5B). FIG. 6 also illustrates a plurality of background RSSI values 620 (e.g., represented by a plurality of dots) recorded by a control device when determining the link quality thresholds using either the averaging procedure or the percentile floor link qualification procedure. The first plot 600 of the link quality 3 threshold $TH_{LQ3}$ determined using the averaging procedure may be, for example, a ten-second average of the background RSSI values 620 taken at a 250 millisecond interval.

The second plot 610 of the link quality 3 threshold $TH_{LQ3}$ determined using the percentile floor link qualification procedure may be, for example, the $95^{th}$ percentile value of the background RSSI values 620. To set the link quality 3 threshold $TH_{LQ3}$ equal to the $95^{th}$ percentile value of the background RSSI values 620, the control device may increase the link quality 3 threshold $TH_{LQ3}$ by an increment x (e.g., 0.95 dB) when one of the background RSSI values 620 exceeds the link quality 3 threshold $TH_{LQ3}$ (e.g., as shown at 612 in FIG. 6), and may decrease the link quality 3 threshold $TH_{LQ3}$ by a decrement y (e.g., 0.05 dB) when one of the background RSSI values does not exceed the link quality 3 threshold $TH_{LQ3}$ (e.g., as shown at 614 in FIG. 6).

Figure 7:
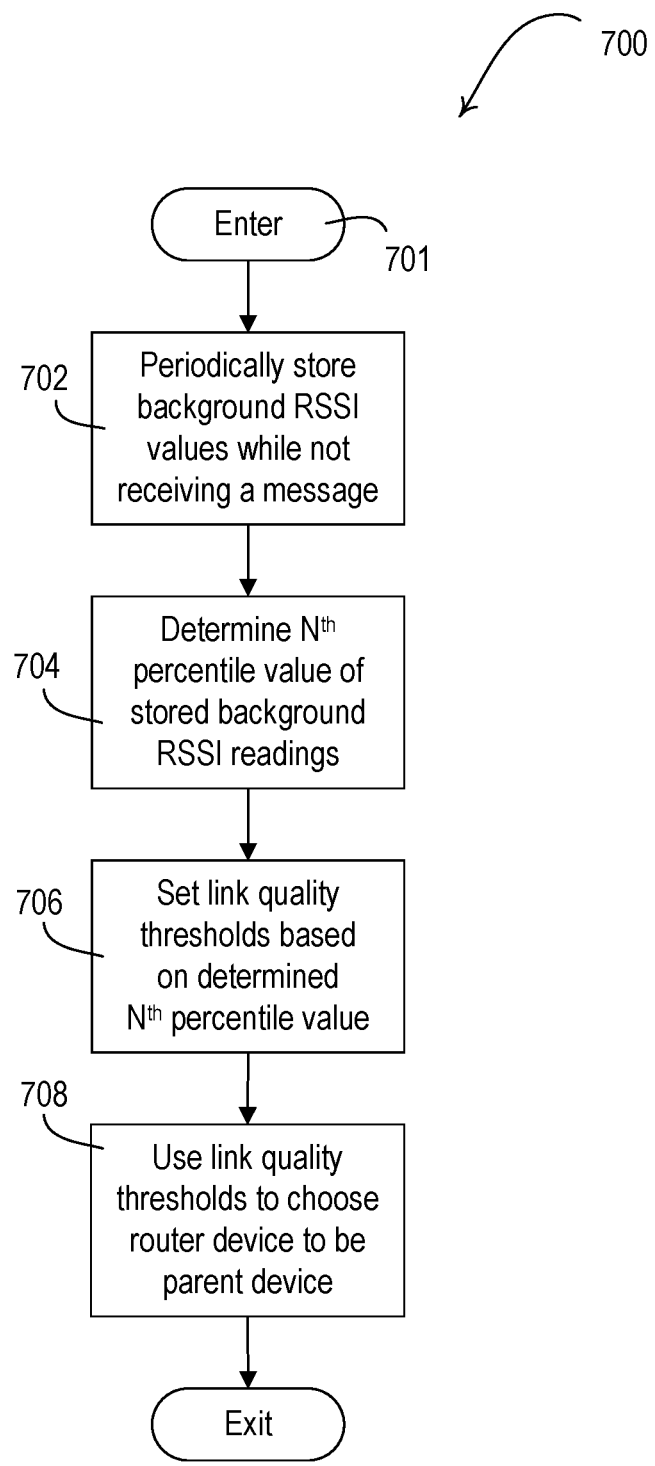
FIGS. 7 and 8 are flowcharts of example configuration procedures (e.g., link quality threshold configuration procedures).

FIG. 7 is a flowchart of an example configuration procedure 700 (e.g., a link quality threshold configuration procedure). The procedure 700 may be performed by a control device operating as an end device (e.g., an end device, such as the end devices 230a, 230b, the router eligible end device 240, and/or the sleepy end device 250) on a network (e.g., the networks 200, 200a, 200b, 200c and/or the network partitions 201, 202, 203). For example, the configuration procedure 700 may be executed at 701 on a continuous and/or periodic basis. The configuration procedure 700 may be executed starting when the control device is first powered up (e.g., before attempting to join a network and/or attach to another device on the network).

At 702, the control device may periodically store background RSSI values (e.g., readings or measurements of background RF energy) while the control device is not presently receiving a message. At 704, the control device may determine the $N^{th}$ percentile value of the background RSSI values (e.g., using a percentile floor link qualification procedure). For example, the control device may determine the $N^{th}$ percentile value (e.g., the $95^{th}$ percentile value) of the background RSSI values by increasing the $N^{th}$ percentile value by an increment x (e.g., 0.95 dB) when a measured background RSSI value exceeds the $N^{th}$ percentile value, and decreasing the $N^{th}$ percentile value by a decrement y (e.g., 0.05 dB) when a measured background RSSI value does not exceed the $N^{th}$ percentile value. In addition, the control device may be configured to use different techniques (e.g., such as, a rank order filter) to determine the $N^{th}$ percentile value of the background RSSI values at 704.

At 706, the control device may set one or more link quality thresholds based on the determined $N^{th}$ percentile value of the background RSSI values. For example, the control device may set a link quality 3 threshold $TH_{LQ3}$ equal to the determined $N^{th}$ percentile value of the background RSSI values at 706. In addition, the control device may set a link quality 1 threshold $TH_{LQ1}$ and a link quality 2 threshold $TH_{LQ2}$ as a function of the determined $N^{th}$ percentile value of the background RSSI values. For example, the link quality 1 threshold $TH_{LQ1}$ and the link quality 2 threshold $TH_{LQ2}$ may be set at respective offsets $z_1$ (e.g., 30 dB) and $z_2$ (e.g., 10 dB) below the link quality 3 threshold $TH_{LQ3}$. At 708, the control device may use the link quality thresholds $TH_{LQ1}$-$TH_{LQ3}$ to choose a router device to be a parent device to which to the control device may attach (e.g., as will be described in greater detail below with reference to FIG. 11).

Figure 8:
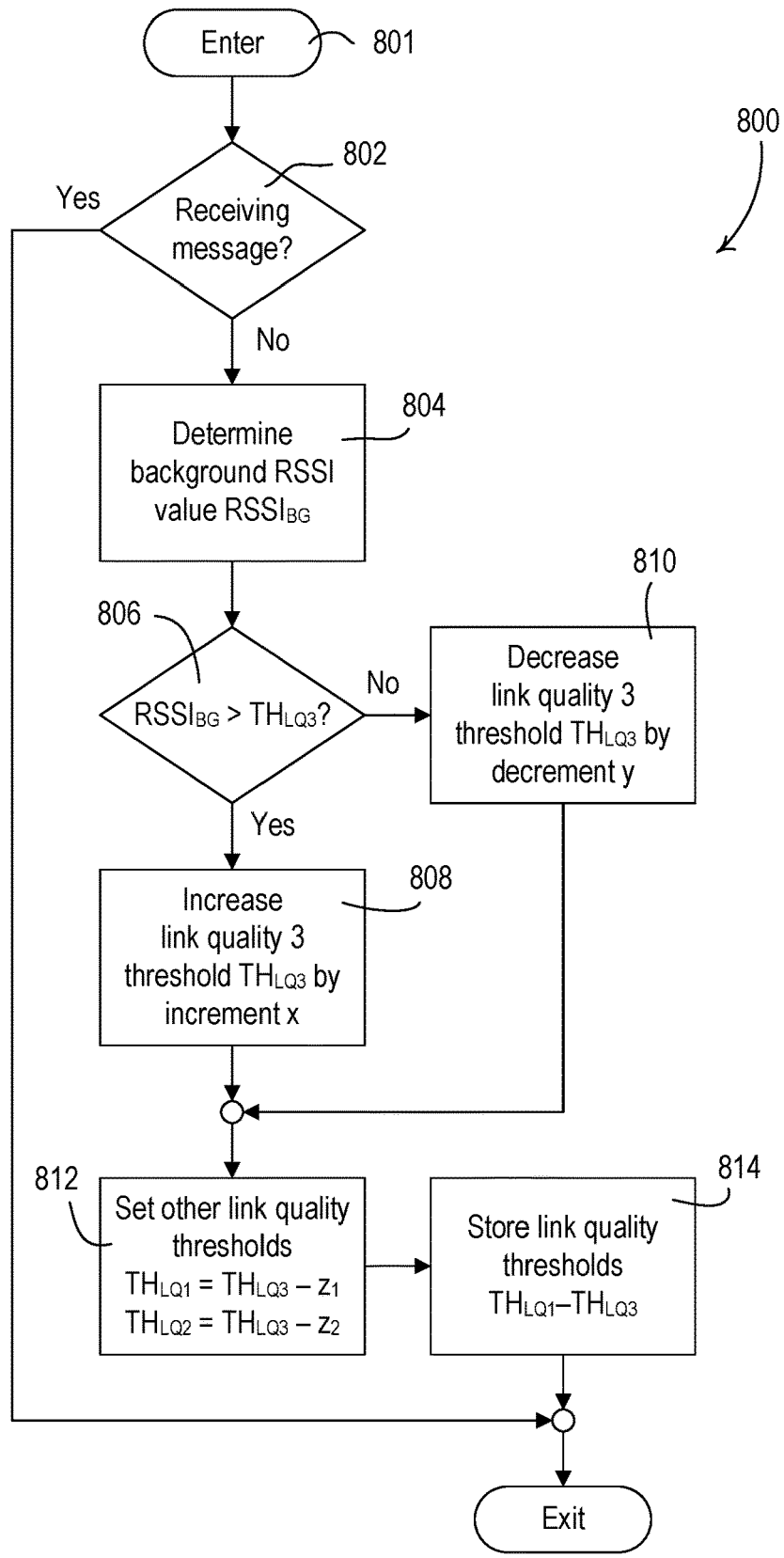

FIG. 8 is a flowchart of an example configuration procedure 800 (e.g., a percentile floor link qualification procedure). The procedure 800 may be performed by a control device operating as an end device (e.g., an end device, such as the end devices 230a, 230b, the router eligible end device 240, and/or the sleepy end device 250) on a network (e.g., the networks 200, 200a, 200b, 200c and/or the network partitions 201, 202, 203). The control device may execute the configuration procedure 800 at 801 in order to determine the $N^{th}$ percentile value of recorded background RSSI values and/or determine one or more link quality thresholds $TH_{LQ1}$-$TH_{LQ3}$ for the control device. The configuration procedure 800 may be executed, for example, at 702, 704, and/or 706 of the configuration procedure 700 shown in FIG. 7. For example, values of the link quality thresholds $TH_{LQ1}$-$TH_{LQ3}$ may be initialized to −100 dB before the start of the configuration procedure 800.

At 802, the control device may determine if the control device is presently receiving a message. When the control device is presently receiving a message at 802, the configuration procedure 800 may simply exit. When the control device is not presently receiving a message at 802, the control device may determine (e.g., measure) a background RSSI value $RSSI_{BG}$ (e.g., an updated background RSSI value) at 804. If the background RSSI value $RSSI_{BG}$ is greater than the value of the link quality 3 threshold $TH_{LQ3}$ at 806, the control device may increase the value of the link quality 3 threshold $TH_{LQ3}$ by an increment x at 808 (e.g., as shown in FIG. 6). If the background RSSI value $RSSI_{BG}$ is not greater than the value of the link quality 3 threshold $TH_{LQ3}$ at 806, the control device may decrease the value of the link quality 3 threshold $TH_{LQ3}$ by a decrement y at 810 (e.g., as shown in FIG. 6). After adjusting the value of the link quality 3 threshold $TH_{LQ3}$ at 808 or 810, the control device may set the values of the link quality 1 threshold $TH_{LQ1}$ and the link quality 2 threshold $TH_{LQ2}$ at 812 based on the determined link quality 3 threshold $TH_{LQ3}$, e.g., $TH_{LQ1}=TH_{LQ3}-z_1$; and $TH_{LQ2}=TH_{LQ3}-z_2$, where offsets $z_1$ and $z_2$ are constants and may be, for example, 30 dB and 10 dB, respectively. At 814, the control device may store the link quality thresholds $TH_{LQ1}$-$TH_{LQ3}$ in memory, before the configuration procedure 800 exits. The control device may use the stored link quality thresholds $TH_{LQ1}$-$TH_{LQ3}$ at a later time when choosing a router device to a parent device to which to the control device may attach (e.g., as will be described in greater detail below with reference to FIG. 11).

Figure 9:
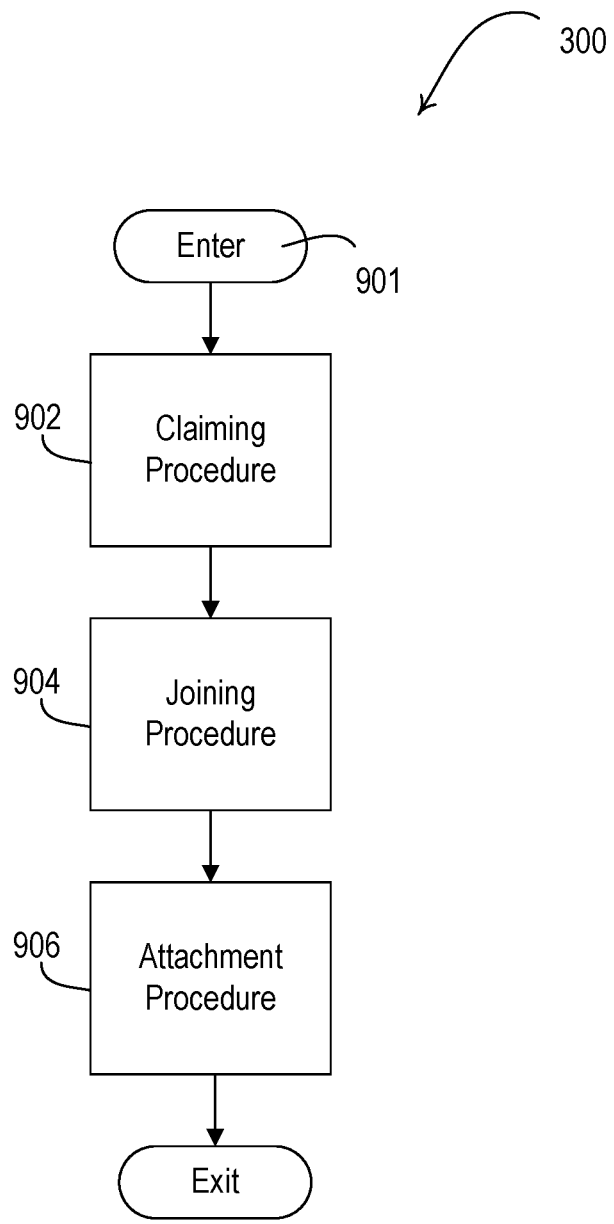
FIG. 9 is a flowchart of an example commissioning procedure.

As described herein, a network may be used to facilitate communication between the respective devices of a load control system. For a respective control device to communicate via the network, the control device may be commissioned. FIG. 9 is a flowchart of an example commissioning procedure 900. The commissioning procedure 900 may be performed by a control device (e.g., an end device, such as the end devices 230a, 230b, the router eligible end device 240, and/or the sleepy end device 250) that is attempting to join a network and/or attach to another device on the network (e.g., the networks 200, 200a, 200b, 200c and/or the network partitions 201, 202, 203). For example, the control device may enter the commissioning procedure 900 at 901 when the control device is first powered and attempting to join the network and/or attach to another device on the network.

At 902, the control device may perform a claiming procedure. The claiming procedure may be used to discover and claim control devices for being added to the network. For example, control devices in the load control system (e.g., load control system 100 shown in FIG. 1) may be claimed using a user's mobile device (e.g., mobile device 190). Each control device may be claimed by a user's mobile device for joining the network and/or attaching to other devices on the network. Each control device may transmit a beacon (e.g., a control device beacon) via a short-range wireless communication link (e.g., using BLE technology, nearfield communication (NFC) technology, or other short-range wireless technology). The mobile device may discover (e.g., receive) beacons transmitted by the control devices in the load control system. Each beacon may include a unique beacon identifier of the control device that transmitted the respective beacon. The unique beacon identifier may include a unique device identifier (e.g., serial number) of the control device itself.

The mobile device may identify one or more control device beacons from which a respective beacon was received at a received signal strength indicator (RSSI) above a predefined value. For example, the mobile device may identify one or more of the beacons transmitting the beacons that are received having the strongest receives signal strength indicators, and the mobile device may transmit a connection message to the control device(s). The control device performing the commissioning procedure 900 may receive the connection message from the mobile device and may be configured to establish a connection (e.g., a two-way communication connection) with the mobile device.

The connection message may indicate to the control device that the control device has been selected for claiming. The connection message may operate as a claiming message, or a separate claiming message may be sent after the connection is established between the mobile device and the control device. The claiming message may indicate that the control device has been claimed for being added to the network. In response to receiving the claiming message, the control device may transmit a claim confirmation message to the mobile device. The claim confirmation message may include a configuration information that may be used to join the control device to the network. For example, the configuration information may include a unique device identifier (e.g., serial number) of the control device and/or network credentials for joining a network. The network credentials may include a network key for the network, a network address for the control device and/or a joiner identifier for the control device. The unique device identifier (e.g., serial number) of the control device may be sent in the claim confirmation message when the unique beacon identifier is not the unique device identifier of the control device. The network address and/or the joiner identifier may be used during the joining procedure to allow the control device to join the network.

During the claiming procedure at 902, or otherwise during the commissioning procedure 900, the mobile device may write information to the control device that is being claimed. For example, the mobile device may write a time the control device was claimed, an identifier of the mobile device and/or application executing a claiming procedure on the mobile device, and/or channel information to assist the control device in getting onto the network through the joining procedure. The information may be sent in the claiming message or in a separate message on the connection established with the mobile device for being stored at the control device. When the mobile device receives the claim confirmation message from the control device to which the mobile device is connected, the mobile device may store the unique device identifier of the control device, the network address for the control device, and/or the joiner identifier for the control device in memory.

The user may continue to move the mobile device around the space in which the load control system is installed to perform the claiming procedure with additional control devices. When the user is done claiming control devices (e.g., the mobile device has claimed all or a portion of the control devices of the load control system), the mobile device may upload the configuration information from the claimed devices to a central computing device, such as a commissioning device (e.g., the system controller 110). The uploaded configuration information may be used to identify the devices for being joined to the network. The central computing device may be a system controller or other device capable of communicating with other control devices in the load control system. The central computing device may be installed at the space being commissioned, or may be a remote computing device. Though the mobile device is described as the device performing communications with the control device(s) during the claiming procedure at 902, other computing devices may perform similar communications with the control device(s) during the claiming procedure. For example, another computing device, such as the commissioning device or system controller, may perform the communications with the control device(s) to perform the claiming procedure, or portions thereof.

At 904, the control device may perform a joining procedure. During the joining procedure at 904, the control device may look for a network to join. The control device may periodically switch between a beaconing mode for being claimed during the claiming procedure at 902 and listening for a network to join during the joining procedure at 904. The control device may begin the joining procedure at 904 after being claimed.

During the joining procedure, the control device may stop transmitting (e.g., periodically transmitting) the control device beacon continuously on a first wireless communication medium (e.g., the short-range wireless communication link) and/or a second wireless communication medium (e.g., the wireless communication network). The control device may listen on the wireless communication network to determine if a request to join the wireless communication network is being transmitted on the wireless communication network. The control device may continue to periodically transmit the control device beacon via the first wireless communication medium (e.g., at a slower rate than in the claiming procedure) in case the mobile device attempts to reconnect to the control device while the mobile device is performing the claiming procedure.

The control device may receive a joiner request message from the central computing device or the commissioning device during the joining procedure. The control device may respond with a request to join the network. The central computing device or the commissioning device may challenge the control device with one or more portions of the configuration information obtained during the claiming procedure. For example, the joiner request message, or another message from the central computing device or the commissioning device, may include a request for one or more portions of the network credentials (e.g., a network key) from the user device. In an example, the central computing device or the commissioning device may identify the network address in the network credentials in the joiner request message and request the joiner identifier from the control device. The control device may respond with the joiner identifier or the network address and the joiner identifier to join the network or network partition. The central computing device or the commissioning device may identify the control device from the unique identifier in the message as being a claimed device and confirm the accuracy of the network credentials to join the control device to the network. The central computing device may transmit the network key to the control device, which may use the network key to connect to the network.

At 906, the control device may perform an attachment procedure. After the control device joins the network, the control device may attempt to attach to another device (e.g., a leader device or a router device) on the network to form the mesh network (e.g., formation of the network) at 906. In order to attach to another device on the network, the control device may send and receive a number of messages via the network. For example, the control device may, at 906, initiate an execution of the procedure 600 (e.g., to start a back-off timer). The control device may also, or alternatively, perform other attachment procedures as described herein.

Though FIG. 9 describes a claiming procedure, joining procedure, and attachment procedure, one or more of these procedures may be performed. For example, the claiming procedure and/or the joining procedure may be omitted, or modified, as control devices may have network credentials prestored thereon (e.g., at manufacture or written to storage thereon by another device, such as the mobile device). In addition, the central computing device may transmit the network credentials to the control device during the claiming procedure at 902. The network credentials may be used by a control device to directly attach to another device on the network. For example, the network device to which the control device attempts attachment may challenge the control device for the network credentials as described herein. As described herein one or more of the claiming, joining, and/or attachment procedures may be performed after power is provided to a control device and the device is turned on. One or more of these procedures may also be performed to reform the network or reattach control devices to the network.

As described herein, a control device may join a network and/or attach to another device on the network in order to communicate with the other control devices on the network. However, if the control device attempts to attach to another device on the network at the same or substantially the same time as other control devices, the likelihood of message collisions may increase and/or the control device may fail to attach to another device on the network. In an attempt to decrease the likelihood of message collisions, the control device may delay its respective attachment procedure such that control devices attach to other devices on the network sequentially (e.g., rather than simultaneously, which may increase likelihood of message collisions and/or increase the likelihood that a respective control device fails to attach to another device on the network). For example, the control devices that are attempting to attach to other devices on a network may delay their respective attachment procedures based on a coordinated startup time. In addition, the coordinated startup time may be individualized for a respective control device, such that the coordinated startup times trigger the control devices to start their respective attachment procedures sequentially.

As part of an initial startup procedure, when a control device is initially powered on and/or attempts to initially attach to another device on a network or network partition (e.g., initial attachment after initially being powered on after being configured and/or reconfigured) the device may perform a startup procedure that is coordinated with other devices on the network or network partition. As an initial startup procedure may be performed at a control device prior to the control device establishing a role on the network for performing communications, a coordinated startup of the devices on the network may be performed to decrease latency and/or potential collisions of messages on the network as devices are attempting to perform an attachment procedure.

Figure 10:
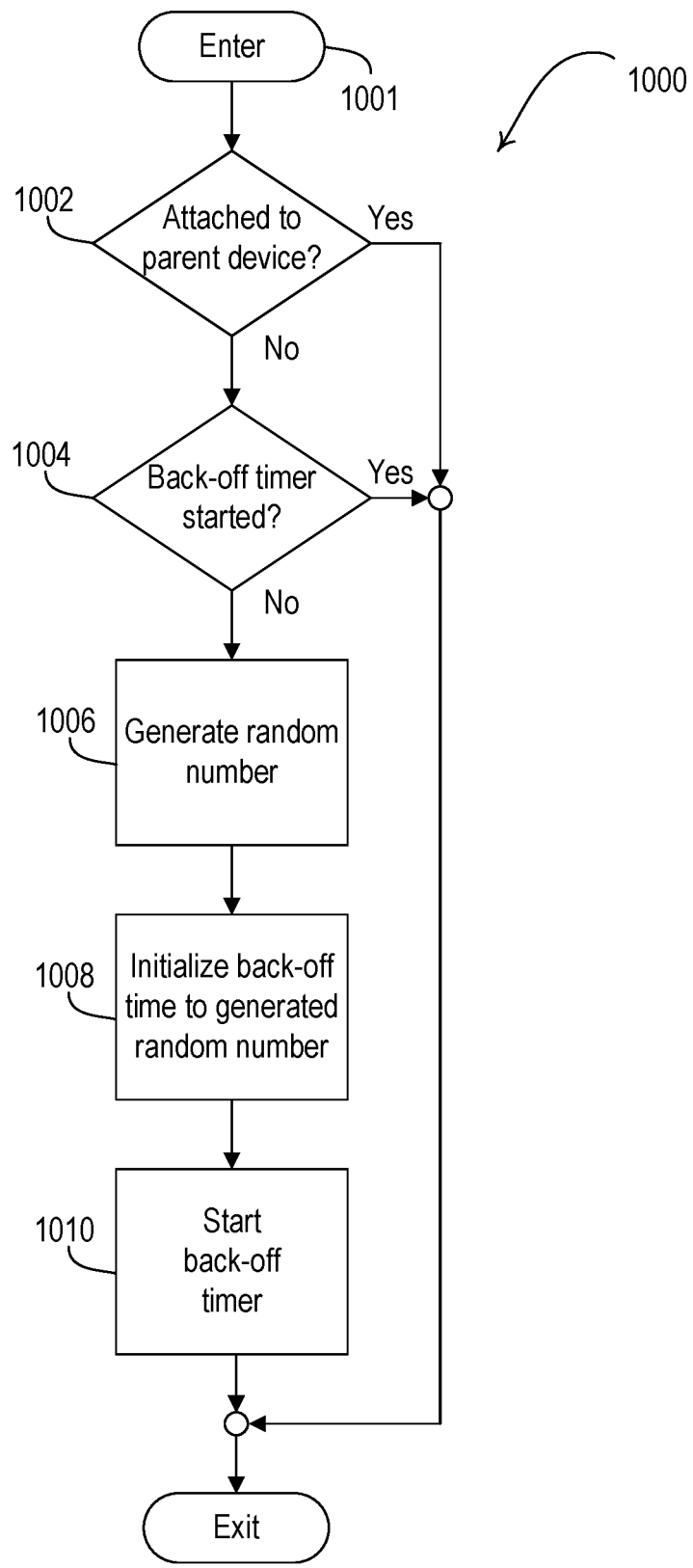
FIG. 10 is a flowchart of an example procedure for attaching to another device on a network.

FIG. 10 is a flowchart of an example procedure 1000 for attaching to a device on a network (e.g., the networks 200, 200a, 200b, 200c and/or the network partitions 201, 202, 203). The procedure 1000 may be performed by a control device (e.g., an end device, such as the end devices 230a, 230b, the router eligible end device 240, and/or the sleepy end device 250) that is attempting to attach to another device on the network (e.g., a potential parent device, such as the leader device 210 and/or the router devices 220a-220d). For example, the control device may initiate the procedure 1000 at 1001 when the control device powers on. In addition, the procedure 1000 may be re-initiated after the control device has attached to a parent device on the network. For example, the control device may unattach from a parent device if the control device is unable to communicate with its parent device (e.g., the parent device is unplugged and/or otherwise unable to communicate with the network) and may re-initiate the procedure 1000 at 1001 to attach to another parent device. In addition, the control device may re-initiate the procedure 1000 when the control device loses connectivity to the network (e.g., when the control device is unplugged or otherwise loses power).

At 1002, the control device may determine whether the control device performing the procedure 1000 is attached to a parent device on the network. If the control device is not attached to a parent device on the network, the control device may determine if a back-off timer has been started and is running at 1004. As described herein, after the back-off timer expires, the control device may attempt to attach to another device on a network, for example, by transmitting a parent request message (e.g., a multicast parent request message). The control device performing the procedure 1000 may refrain from attaching to a parent device on the network (e.g., may not attempt to attach to a parent device the network) while a back-off timer is running. The resolution of the back-off timer may be in milliseconds and/or may be represented by a plurality of bits (e.g., thirty-two bits). The back-off timer may cause the control device to delay attempting to attach to a parent device on the network to allow for other devices to attach to parent devices on the network 200. For example, the back-off timer may allow parent devices to process parent request messages from other devices. Accordingly, the procedure 1000 may exit if the back-off timer has been started and is still running.

If, however, a back-off timer has not been started and/or is not currently running, a random number may be generated at 1006. For example, the random number may be generated by randomly selecting a number from a predefined range of back-off times (e.g., zero to four seconds). At 1008, the back-off timer may be initialized with the random number generated at 1006 and, as described herein, the device may refrain from attaching to the network for the back-off timer period of time. Initializing the back-off timer to the generated random number may decrease the likelihood that multiple devices attempt to attach to the network at the same time or within the same time frame (e.g., as it is unlikely that a plurality of devices will generate the same random number) and increase the chance of the device successfully attaching to the network. As described herein, when multiple devices attempt to attach to a network at the same time, the messages transmitted to attach to the network (e.g., parent request message and parent response messages) may collide, which may cause the attachment to fail and/or be delayed. At 1010, the back-off timer may be started (e.g., started counting down) and the procedure 1000 may exit.

Figure 11:
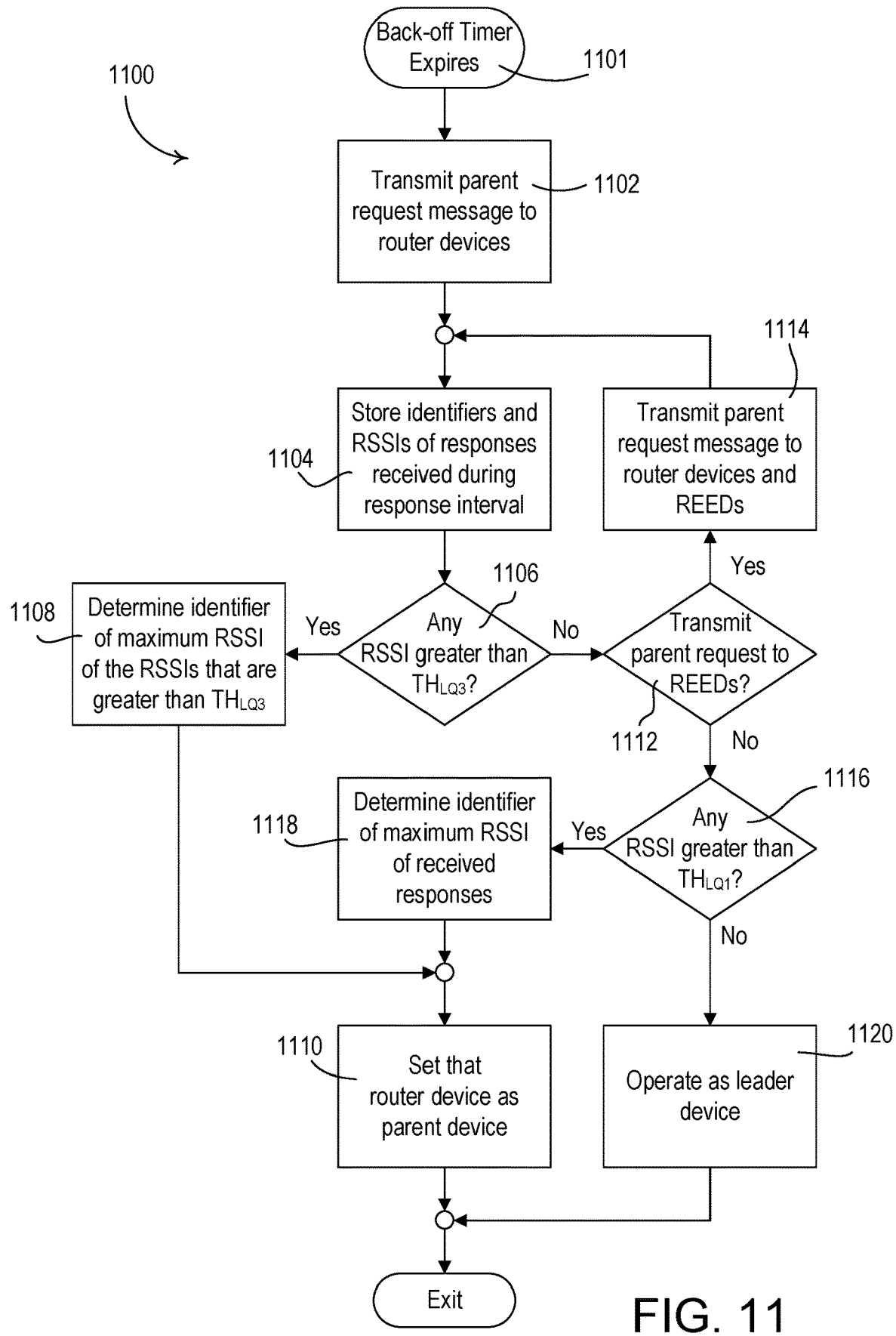
FIG. 11 is a flowchart of an example attachment procedure (e.g., a parent attachment procedure) for attaching to another device on a network.

FIG. 11 is a flowchart of an example attachment procedure 1100 (e.g., a parent attachment procedure) that may be performed by a control device in response to expiration of the back-off timer (e.g., the back-off timer started at 910 of the commissioning procedure 900). The attachment procedure 1100 may be performed by the control device while the control device is attempting to attach to another device (e.g., a parent device) on a network or network partition (e.g., the networks 200, 200a, 200b, 200c and/or the network partitions 201, 202, 203). For example, the attachment procedure 1100 may be performed by the end devices 230a, 230b, the router eligible end device 240, and/or the sleepy end device 250 when these devices are not attached to a parent device. When the back-off timer expires at 1101, the control device may transmit a parent request message to the router devices on the network at 1102. For example, the parent request message may be transmitted by the control device to attempt to attach to one of the router devices, such that the router device may operate as a parent device for the control device. The control device may set a parent request link quality threshold $TH_{LQ\text{-}PR}$ equal to a highest link quality threshold (e.g., the link quality 3 threshold $TH_{LQ3}$) at 1102.

After the parent request message is transmitted at 1102, the control device may receive a plurality of parent response messages in response to the transmitted parent request message (e.g., from any router device that receives the transmitted parent request message). At 1104, the control device may store the identifiers (e.g., router identifiers of router devices) and the corresponding received signal strength indicators of the parent response messages received over a response interval (e.g., approximately one second). At 1106, the control device may determine if any of the received signal strength indicators of the received parent response messages are greater than a link quality 3 threshold $TH_{LQ3}$. For example, the link quality 3 threshold $TH_{LQ3}$ may be determined using a percentile floor link qualification procedure (e.g., based on a $95^{th}$ percentile value of background RSSI values) and may be stored in memory at 814 of procedure 800 (e.g., as shown in FIG. 8). If any of the received signal strength indicators of the received parent response messages are greater than the link quality 3 threshold $TH_{LQ3}$ at 1106, the control device may determine the identifier (e.g., router identifier) of router device from which a parent response message with the maximum received signal strength indicator of the each of the parent response messages received during the response interval at 1108. At 1110, the control device may set the router device determined at 1108 as its parent device, before the attachment procedure 1100 exits.

If none of the received signal strength indicators of the received parent response messages are greater than the link quality 3 threshold $TH_{LQ3}$ at 1106, the control device may determine if the parent request device should be transmitted to the router-eligible end devices (REEDs) on the network at 1112. The control device may determine, at 1112, to transmit a parent request message to the router-eligible end devices if two parent request messages have not already been transmitted to the router-eligible end devices. If the control device determines to transmit a parent request message to the router-eligible end devices at 1112, the control device may transmit a parent request message to the router devices and the router-eligible end devices on the network at 1114. At 1104, the control device may store the identifiers (e.g., router identifiers of router devices and/or unique identifiers of router-eligible end devices) and the RSSIs of the parent response messages from the routers and router-eligible end devices received over the response interval. If any of the received signal strength indicators of the received parent response messages are greater than the link quality 3 threshold $TH_{LQ3}$ at 1106, the control device may determine the identifier of the router device and/or the router-eligible end device from which a parent response message with the maximum received signal strength indicator at 1108. At 1110, the control device may set the router device and/or the router-eligible end device determined at 1108 as its parent device, before the attachment procedure 1100 exits. If a router-eligible end device is identified at 1108, the control device may transmit a request for the router-eligible end device to become a router device at 1110. If the router-eligible end device does not respond to the request and/or does not become a router, the control device may jump to 1116 of the attachment procedure 1100 or may execute the procedure 1100 again without setting that router device as a parent device at 1110.

If the control device determines not to transmit a parent request message to the router-eligible end devices at 1110 (e.g., the control device has already transmitted two parent request messages to the router-eligible end devices at 1114), the control device may determine, at 1116, if any of the received signal strength indicators of the received parent response messages are greater than a link quality 1 threshold $TH_{LQ1}$ (e.g., as determine at 812 and stored in memory at 814 of procedure 800 shown in FIG. 8). If any of the received signal strength indicators of the received parent response messages are greater than the link quality 1 threshold $TH_{LQ1}$ at 1116, the control device may determine the identifier of the router device and/or the router-eligible end device from which a parent response message with the maximum received signal strength indicator at 1118 (e.g., independent of whether the received signal strength indicator is greater than the link quality 3 threshold $TH_{LQ3}$). At 1110, the control device may set the router device and/or the router-eligible end device determined at 1108 as its parent device, before the attachment procedure 1100 exits. If none of the received signal strength indicators of the received parent response messages are greater than the link quality 1 threshold $TH_{LQ1}$ at 1116, the control device may begin to operate as a leader device at 1120, and the attachment procedure 110 may exit.

While the attachment procedure 1100 is described herein with the control device comparing the received signal strength indicators of the parent response messages to determine the router devices to which to attach (e.g., at 1106 and 1108), the control devices may also use other characteristics of the received parent response messages. For example, the control device may use a link quality determined from the received parent response messages to determine the router devices to which to attach. The control device may determine a link margin for each of the received parent response messages by subtracting the noise floor value (e.g., which may be equal to the link quality 1 threshold) from the received signal strength indicator of the received parent response message. The control device may then determine the link quality from the determined link margin. For example, the control device may set the link quality to three if the link margin is 30 dB or greater, to two if the link margin is between 10 dB and 30 dB, to one if the link margin is between 0 dB and 10 dB, and to zero if the link margin is less than 0 dB. The control device may attempt to attach to router devices if the determined link quality is three.

After network formation, including the attachment of one or more end devices to router devices and/or the leader device to form network links within the network, a network optimization procedure may be performed to improve the network links within the network. As described herein, the control devices that are attached to a network (e.g., the networks 200, 200a, 200b, 200c shown in FIGS. 2A-2E) may each be assigned a respective role during network formation. Control devices that are assigned certain roles on the network, such as the role of leader device or router device, may be configured to facilitate communication with control devices that are assigned other roles on the network, such as end devices (e.g., including end devices, sleepy end devices, and/or router eligible end devices, as described herein). The roles of the leader device and/or the router devices may be initially assigned on a first-come-first-serve basis, and end devices may be attached thereto as described herein. For example, the control devices that attempt to join a network first may be assigned roles that are configured to facilitate the communication of other control devices that subsequently join the network, such as end devices that attach to the router devices as described herein. This may result in degradation of the quality of network links as the network evolves and other devices are added to the network, or in the vicinity of the network. For example, control devices may establish network links with one another that provide the best quality network links at the time. But over time, the quality of these network links may be subject to change and, in certain scenarios (e.g., when noise sources are introduced to the network), the quality of these network links may degrade.

Noise sources (e.g., noise-generating devices) may be located in the space in which the network is deployed. For example, noise sources that may be located in the vicinity of the network may be wireless access points (WAPs), microwaves, video cameras, security badge readers, and other noise-generating devices. The existence of noise sources in a network may cause the quality of communication on a network link or network to degrade. As noise sources are added to a space that may degrade the quality of communications on a network link, other control devices may be added to the network, and their addition may be able to improve the quality of communications on the network link or network. The roles of the control devices joined or connected to the network may be updated to improve the quality of communications. For example, the roles of control devices that are located near noise sources may be assigned in a manner to optimize or otherwise improve the quality of communications in the space in which the network is deployed. In addition, control devices may experience lower-quality network links with other control devices, for example, if the control devices are installed in an isolated location (e.g., a location that is not proximate to other control devices on the network).

Control devices may be assigned to the role of leader device or router device according to a pre-defined procedure (e.g., pre-defined by the respective network or protocol), and end devices may be attached thereto, as described herein. The role of leader device and router devices may initially be assigned to control devices on a first-come-first-serve basis at initial startup of the network (e.g., when the control devices in the network are powered on). For example, after joining or connecting to a network, a control device may attempt to initiate attachment to another device on the network (e.g., by transmitting a parent request message). If the control device fails to attach the other device on the network (e.g., fails to receive a response to the parent request message, for example, because a leader device or router device fails to be on the network), the control device may be assigned the role of leader device. Over time, other control devices may join or connect to the network and attempt to attach to the control device assigned to the role of leader device. For example, the other control devices may each initially be assigned the role of end device. Further, as described herein, the leader device may determine to adjust the roles of other control devices, for example, by upgrading one or more of the other control devices to the role of router device. In determining to adjust the roles of the other control devices, however, the leader device may fail to consider the quality of communications on network links experienced by a respective control device.

When roles are assigned in such a manner, control devices that experience lower-quality of communications on network links may be assigned the role of a leader device or a router device, which are the control devices configured to facilitate communications between other control devices in the network (e.g., control devices that are assigned the roles of end devices, including end devices, sleepy end devices, router eligible end devices, etc. as described herein). Similarly, when roles are assigned in such a manner, there may fail to be control devices that are assigned to the role of leader device or router device near noise sources. Assigning the role of leader device or router device to control devices that experience lower quality communications may decrease the overall quality of communications on the network links and/or the network as a whole. Over time, networks that assign control devices that experience lower-quality network links with other control devices to the role of leader device or router device may experience an increased likelihood of communication failures, particularly in locations in which a noise source is located on the network. Accordingly, certain network optimization procedures may be performed such that the roles assigned to control devices may be based on the quality of a respective control device's network links with other devices on the network.

After the network is formed (e.g., as described herein) the quality of the network links between a control device and other respective control devices may be considered when assigning roles to respective control devices. For example, networks may enter a router optimization mode to assess and/or determine the quality of the network links between the control device and the other respective control devices, and optimize the roles assigned to the control devices on the network, for example, based on the quality of the network links between the control device and the other respective control devices on the network. The roles assigned to control devices may be updated as a result of the router optimization mode. For example, while the role of leader device may be initially assigned to a first control device, the role of leader device may later be assigned to another control device based on the router optimization mode.

A router optimization mode may be initiated by a user via an application running on a computing device (e.g., the mobile device 190 shown in FIG. 1 or other suitable computing device, such as a personal computer). Also, or alternatively, the router optimization mode may be triggered periodically (e.g., by a system controller, such as the system controller 110 shown in FIG. 1) and/or by a control device on the network (e.g., a control device assigned the role of leader device). For example, a control device may trigger the router optimization mode after detecting a change in the quality of network communications (e.g., such as by a control device detecting an increased packet loss within the network).

During a router optimization mode, the control devices that are communicating over the network may transmit (e.g. via unicast messages, multicast messages, and/or broadcast messages) one or more optimization messages. The control devices that receive these optimization messages may measure and store a communication quality metric of the optimization message along with an indication (e.g., a unique identifier) of the control device that transmitted the optimization message (e.g., optimization data). This optimization data may identify the number and quality of possible network links that a control device could establish on the network.

The control devices may transmit the optimization data to allow the roles of the control devices in the network to be configured based on the optimization data. For example, the roles of the control devices may be configured based on one or more communication quality metrics that are included in the optimization data. As described herein, the communication quality metric may include or be calculated from an RSSI value at which the optimization messages are received, a link margin value (e.g., a link margin relative to the noise floor value NF) associated with the received optimization messages, and/or a signal-to-noise ratio value for the optimization messages received from the corresponding control device. The control devices may indicate in the optimization data the one or more link qualities using the communication quality metrics that are determined from the optimization messages received from each individual device indicated in the optimization data. For example, the control devices may each indicate in the optimization data the determined link quality for each of the possible network links (e.g., possible attachments) with other control devices.

The control devices transmitting the link margin or signal-to-noise ratio value may provide more data and/or a higher resolution of the link quality on a network link than transmitting the link quality indicator (e.g., LQI and/or LQO) that is determined from the link margin or signal-to-noise ratio. The signal-to-noise ratio value may include the signal strength at which a control device receives the optimization message from another control device, minus a noise floor value NF that may be set relative to one or more link quality thresholds, as described herein. The link quality indicator may be calculated, as described herein, by subtracting a noise floor value that is determined at the control device. The transmitting of the link quality indicator may incur additional processing at the control device from which the link quality is being transmitted, but save on network resources that may be used to transmit the message. The link quality indicator may include less data, but also a lower resolution of the link quality on a network link.

As described further herein, the optimization data may be used to identify optimized roles for the control devices in the network. Each of the control devices may transmit their respective optimization data to another control device (e.g., the system controller) that processes the optimization data. The system controller, or another control device on the network (e.g., the control device assigned to the role of leader device on the network), may process and analyze the optimization data received from the various control devices to generate optimized network data. The system controller may use the optimization data to determine the optimized roles of the control devices in the network. The system controller may generate optimized network data that includes the optimized roles of the control device on the network based on the optimization data.

The roles of certain control devices on a network may be updated or changed to conform with the optimized network data. For example, in certain scenarios the control device previously assigned to the role of leader device may be downgraded to the role of router device or end device. The leader device may send a message (e.g., leader abdicate message) indicating to other devices that the leader device may be downgraded and/or a time at which the leader device is to be downgraded. In addition, the message may indicate the control device that is taking over the role of leader device. A control device assigned the role of router device may similarly be upgraded to the role of leader device or downgraded to the role of end device. For example, a message indicating to other device of the updated role of the device may be multicast throughout the network (e.g., multicast to each of the devices on the network). The message may also include a time at which the updated role of the device is to be effectuated.

Further, a control device assigned to the role of end device may be upgraded to the role of leader device and/or router device based on the optimization data. When a control device is being upgraded to the role of leader device, for example, the leader device may transmit (e.g., via unicast) a message (e.g., a leader abdicate message) to the control device indicating that the control device is to take over the role of leader device. When the control device is being upgraded to the role of router device, the leader device may transmit (e.g., via unicast) a message indicating that the control device is to be upgraded to the role of router device to the control device. In addition, the message may include the router identifier assigned to the control device.

Figure 12:
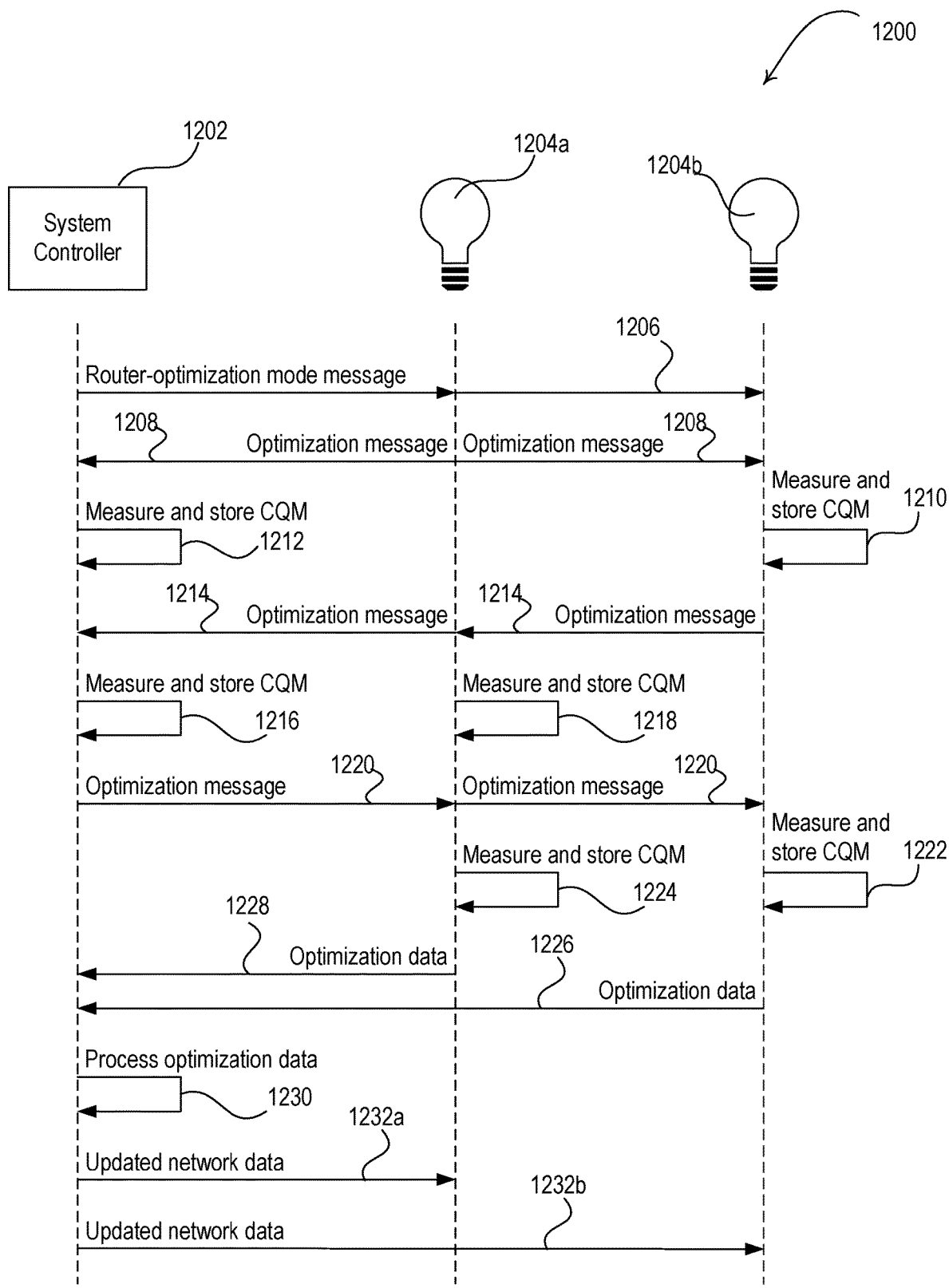
FIG. 12 is a sequence flow diagram illustrating example messages communicated between devices in a network.

FIG. 12 illustrates a sequence flow diagram 1200 illustrating example messages transmitted between a system controller 1202 and lighting devices 1204a, 1204b. The system controller 1202 and the lighting devices 1204a, 1204b may be connected to a network that allows the system controller 1202 and the lighting devices 1204a, 1204b to communicate with one another (e.g., a network that is similar to networks 200, 200a, 200b, 200c and/or network partitions 201, 202, 203). The system controller 1202 and the lighting devices 1204a, 1204b may each be assigned roles on the network, as described herein.

The system controller 1202 may trigger a router optimization mode, which, as described herein, may be used to assign the roles of control devices on a network. The assignment of the roles may be a reassignment of the roles after the roles have already been established. For example, the system controller 1202 may transmit a message (e.g., a router optimization mode message) 1206 to trigger the lighting devices 1204a, 1204b to enter the router optimization mode. The system controller 1202 may transmit the router optimization mode message 1206 to the lighting devices 1204a, 1204b as a unicast message, a multicast message, and/or a broadcast message. Although not shown in FIG. 12, the system controller 1202 may transmit router optimization mode message to additional devices. Also, or alternatively, another device initiate a router optimization mode and/or transmit router optimization messages.

After receiving a router optimization mode message, a control device may transmit one or more optimization messages. For example, after receiving the router optimization mode message 1206 from the system controller 1202, the lighting device 1204a may transmit an optimization message 1208. The optimization message 1208 may include an indication of the source of the optimization message (e.g., a unique identifier of the source, such as the network address) As shown in FIG. 12, the lighting device 1204a may transmit the optimization message 1208 (e.g., as a unicast message, a multicast message, or a broadcast message) to the other devices in the network, e.g., the system controller 1202 and the lighting device 1204b as shown in FIG. 12. Though not shown in FIG. 12, the lighting device 1204a may transmit optimization messages to additional devices.

A control device that receives an optimization message from another control device may measure and store a communication quality metric of the optimization message along with an indication of the device that transmitted the optimization message (e.g., the network address). The communication quality metric may include the received signal strength identifier (RSSI) of the optimization message. The communication quality metric may be calculated from the RSSI of the optimization message. For example, the communication quality metric may include a link margin or a signal-to-noise ratio value. The link margin may be a value relative to a predefined receive level. The link margin may, for example, indicate a relative value above a noise floor value NF. Each link margin value may indicate whether the optimization message was received at the control device above or below a link quality threshold. The link margin value and/or the signal-to-noise ratio value of a message may be calculated by subtracting a noise floor value of the noise floor at the control device from a received signal strength (e.g., RSSI) at which the message is received (e.g., the difference between the received signal strength identifier and the noise floor). In addition, or alternatively, the communication quality metric may include a link quality value (e.g., a link quality in or link quality out) itself, which may also be calculated as a predefined value above a noise floor value NF. The communication quality metric may be a calculated for each optimization message that is received, or may be averaged for multiple optimization messages received over time.

The control devices may use one or more link quality thresholds (e.g., the link quality 3 threshold $TH_{LQ3}$, the link quality 2 threshold $TH_{LQ2}$, and/or the link quality 1 threshold $TH_{LQ1}$) to calculate the communication quality metric for the optimization messages received from another control device with which a possible network link (e.g., attachment) may be created. For example, as described herein, the control devices may each set the link quality 3 threshold $TH_{LQ3}$ to an $N^{th}$ percentile (e.g. the $95^{th}$ percentile) value of the background RSSI values that are measured at the control device. The other link quality thresholds $TH_{LQ2}$ and $TH_{LQ1}$ may be set based on the determined link quality 3 threshold $TH_{LQ3}$. The noise floor value NF may be dependent on the $N^{th}$ percentile of the background RSSI values. For example, the link quality 1 threshold $TH_{LQ1}$ may be set equal to the noise floor value NF, or be set to a link margin value above the noise floor value NF. As such, the link margin value or the signal-to-noise ratio value at which the optimization messages are received may be a value that is dependent on the $N^{th}$ percentile value of the background RSSI values to which the link quality 3 threshold $TH_{LQ3}$ may be set.

As the communication quality metric may be a link quality indicator, the control device may calculate the link quality for the optimization messages received from each individual device using one or more of the link quality thresholds. For example, the communication quality metric of the optimization message 1220 measured at the lighting devices 1204a may be greater than the link quality 3 threshold $TH_{LQ3}$ that is stored at the lighting device 1204a, while the communication quality metric of the optimization message 1214 measured at the lighting device 1204a may be greater than the link quality 2 threshold $TH_{LQ2}$. The control devices may each indicate in the optimization data the determined link quality indicator for each of the possible network links (e.g., attachments) with other control devices. In another example, the communication quality metrics of the optimization messages (e.g., RSSI values) may be sent in the optimization data with one or more link quality thresholds, such that the system controller 1202 may determine the communication quality metrics that meet the one or more link quality thresholds.

At 1210, the lighting device 1204b may measure and store the communication quality metric of the optimization message 1208 transmitted by lighting device 1204a. At 1212, the system controller 1202 may measure and store the communication quality metric of the optimization message 1208 transmitted by lighting device 1204a. The communication quality metric of the optimization message 1208 may be measured and stored at the system controller and the lighting device 1204b for each device to identify the quality of communications being received from the lighting device 1204a. In addition to the communication quality metric, lighting device 1204b and system controller 1202 may store an indication of the optimization message's source, such as a network identifier for lighting device 1204*a*.

In response to the router optimization mode message 1206, the lighting device 1204*b* may transmit an optimization message 1214 that includes its network identifier to the lighting device 1204*a* and system controller 1202. The lighting device 1204*b* may transmit the optimization message 1214 (e.g., as a unicast message, a multicast message, or a broadcast message) to the other devices in the network, e.g., the system controller 1202 and the lighting device 1204*a*. Again, although not shown in FIG. 12, the lighting device 1204*b* may also transmit optimization messages to additional devices. At 1218, the lighting device 1204*a* may measure and store the communication quality metric of the optimization message 1214 transmitted by the lighting device 1204*b*. At 1216, the system controller 1202 may measure and store the communication quality metric of the optimization message 1214 transmitted by the lighting device 1204*b*. The communication quality metric of the optimization message 1214 may be measured and stored at the system controller and the lighting device 1204*a* for each device to identify the quality of communications being received from the lighting device 1204*b*. In addition to the communication quality metric, the lighting device 1204*a* and the system controller 1202 may store an indication of the optimization message's source, such as a network identifier for the lighting device 1204*a*.

The device that initially transmitted the router optimization mode message may also transmit an optimization message to other control devices. For example, the system controller 1202 may transmit an optimization message 1220 to the lighting devices 1204*a*, 1204*b*. At 1224, the lighting device 1204*a* may measure and store the communication quality metric of the optimization message 1220 transmitted by the system controller 1202. At 1222, the lighting device 1204*b* may measure and store the communication quality metric of the optimization message 1220 transmitted by the system controller 1202. The communication quality metric of the optimization message 1220 may be measured and stored at the lighting devices 1204*a*, 1204*b* for each device to identify the quality of communications being received from the system controller 1202. In addition to the communication quality metric, the lighting devices 1204*a*, 1204*b* may store an indication of the optimization message's source, such as a network identifier for the system controller 1202. Though the flow diagram shows the system controller 1202 transmitting a separate optimization message 1220 that may be transmitted and measured at the lighting devices 1204*a*, 1204*b* to identify the quality of communications transmitted by the system controller 1202, the lighting devices 1204*a*, 1204*b* may measure and store a communication quality metric of the router optimization mode message 1206 that is transmitted from the system controller 1202 to initiate the router optimization procedure.

As described herein, the control devices that receive optimization messages may aggregate the communication quality metrics of the received optimization messages in link quality information and generate optimization data that includes the link quality information. The optimization data from a given control device may indicate the number of control devices from which the optimization messages are received and the quality of the network links on which the optimization messages are received. For example, the optimization data may include the network addresses for each control device from which an optimization message has been received and the corresponding communication quality metrics for the optimization message received from that control device.

After generating the optimization data, a control device may transmit the optimization data to another control device to process and analyze the optimization data. The control device to which the optimization data is transmitted may be the same control device that transmitted the router optimization mode message, or another control device. As shown in FIG. 12, the lighting device 1204*a* may transmit optimization data 1228 to the system controller 1202. The optimization data 1228 may include the network identifier of the lighting device 1204*b* and the network identifier of the system controller 1202, each with a respective communication quality metric of the optimization messages 1214, 1220 received from the lighting device 1204*b* and the system controller 1202. The optimization data 1228 may include one or more link quality thresholds and/or the noise floor value NF measured at the lighting device 1204*a*. The lighting device 1204*b* may transmit optimization data 1226 to the system controller 1202. The optimization data 1226 may include the network identifier of the lighting device 1204*a* and the network identifier of the system controller 1202, each with a respective communication quality metric of the optimization messages 1208, 1220 received from the lighting device 1204*a* and the system controller 1202. The optimization data 1226 may include one or more link quality thresholds and/or the noise floor value NF measured at the lighting device 1204*b*. The system controller 1202 may have its own optimization data stored in memory that includes the network identifier of the lighting devices 1204*a*, 1204*b*, each with a respective communication quality metric of the optimization messages 1208, 1214 received from the lighting devices 1204*a*, 1204*b*. The optimization data of the system controller 1202 may include one or more link quality thresholds and/or the noise floor value NF measured at the system controller 1202.

At 1230, the system controller 1202 may process the optimization data, for example, to determine the number of higher-quality communications experienced at a device. For example, the system controller 1202 may process the communication quality metrics in the optimization data to determine the control devices to be assigned as the leader device and/or router devices in the network. In generating optimized network data, the system controller 1202 may determine the control devices capable of communicating with other devices on higher-quality network links to be assigned as the leader device and/or the router devices based on the optimization data received from each of the control devices. For example, as the optimization data received from each control device identifies communication quality metrics indicating the quality of possible network links that a respective control device can establish with other control devices on the network, the system controller 1202 may assign the role of leader device and/or router device to the control devices having a larger number of possible network links that can be established above a defined quality threshold before control devices that do not have a larger number of possible network links that can be established above the defined quality threshold.

The defined quality threshold may be set to a link quality value or link quality indicator (e.g., link quality of 3, 2, 1, etc.). The system controller 1202 may receive a link margin or a signal-to-noise ratio value for the optimization messages received on a network link and determine the strength of the network link based on the link quality indicated by the link margin or a signal-to-noise ratio. For example, a link margin or signal-to-noise ratio value that indicates a signal strength of at least 20 dB above the noise floor value NF may indicate a link quality of 3. A link margin or a signal-to-noise ratio value that indicates a signal strength of at least 10 dB above the noise floor value NF may indicate a link quality of 2. A link margin or a signal-to-noise ratio value that indicates a signal strength of at least 2 dB above the noise floor value NF may indicate a link quality of 1.

In another example, the system controller 1202 may receive an RSSI value at which optimization messages are received on a network link and compare the RSSI value to a noise floor value NF or one or more link quality thresholds (e.g., link quality 3 threshold $TH_{LQ3}$, link quality 2 threshold $TH_{LQ2}$, and/or link quality 1 threshold $TH_{LQ1}$) to identify a link margin of the optimization messages relative to the noise floor. The system controller 1202 may then determine the strength of the network link based on the link quality indicated by the link margin for the optimization messages received on the network link. As described herein, the system controller 1202 may directly receive a link quality indicator in the optimization data that indicates the link quality of a network link on which optimization messages are received from a control device.

The system controller 1202 may evaluate the strength of the possible network links of each of the control devices to identify the control devices having the greatest number of possible preferred network links to other control devices. A preferred network link may have a link quality equal to or greater than 3 (e.g., at least 20 dB above the noise floor). The system controller 1202 may assign the control devices having the greatest number of possible preferred network links to the role of router device. One of the router devices may be assigned the role of leader device. For example, the role of leader device may be assigned to the control device having the highest quality of possible preferred network links or the greatest number of possible preferred network links of the devices identified for being assigned as router devices. The system controller 1202 may continue to assign the control devices having the greatest number of possible preferred network links to the role of router device, until the number of available router devices for the network have been assigned or each of the control devices having possible preferred network links have already been assigned the role of router devices. The system controller 1202 assigning the role of router device to the control devices in this manner is an attempt to have each of the end devices in the network have a preferred network link (e.g., a link quality equal to or greater than 3) to a router device on the network.

If there are additional router devices that may be assigned in the network, the system controller 1202 may evaluate the strength of the possible network links of each of the control devices using a second quality threshold. The system controller 1202 may use the second quality threshold to consider control devices having possible secondary network links to other control devices for being assigned the role of router device. A secondary network link may have a link quality equal to 2 (e.g., at least 10 dB above the noise floor). The system controller 1202 may assign control device having possible secondary network links to the role of router device, or to the role of the leader device if the leader device was not assigned using the previous quality threshold. The system controller 1202 may continue to assign the control devices having possible secondary network links to the role of router device, until the number of available router devices for the network have been assigned or the control devices having possible secondary network links have already been assigned the role of router devices.

If there are additional router devices that may be assigned in the network, the system controller 1202 may evaluate the strength of the possible network links of each of the control devices using a third quality threshold. The system controller 1202 may use the third quality threshold to identify control devices having possible tertiary network links to other control devices. A tertiary network link may have a link quality equal to 1 (e.g., at least 2 dB above the noise floor or set equal to the noise floor). The system controller 1202 may assign the control device having possible tertiary network links to the role of router device, or to the role of the leader device if the leader device was not assigned using the previous quality thresholds. The system controller 1202 may continue to assign the control devices having possible tertiary network links to the role of router device, until the number of available router devices for the network have been assigned or the control devices having possible tertiary network links have already been assigned the role of router devices.

The tertiary network links for each control device may include the control devices that have sub-par connections with the particular control device. The control devices that have tertiary network links with one or more control devices may be control devices that may be promoted to router devices that are in a troubled area for performing network communications. These router devices (e.g., the router devices that have tertiary network links to other control devices) may be located in portions of the network where the noise source is stronger, and may be used to intentionally backfill router devices in these potentially more troublesome areas of the network around a noise source. If there are additional router devices to be assigned in the network, the router devices may be assigned around the router devices that have tertiary network links to help strengthen the communications in these areas of the network.

The system controller 1202 may assign one more additional control devices to the role of router devices, for example, until there are at least a minimum number of router devices in the network. If the minimum number of router devices is not met by assigning the router devices using the assigned values of the quality thresholds, the quality thresholds used by the system controller 1202 may be lowered and the system controller 1202 may execute the process again to assign the roles of leader device and/or router device. The process of assigning the roles again may be executed using the previously-received optimization data or the system controller 1202 may receive updated optimization data from the control devices.

The system controller 1202 may assign router devices in the network, such that router devices may be grouped or bunched around noise source (e.g., assign control devices surrounding noise sources to the role of router device). As described herein, noise sources may cause the quality of communication on a network link or network to degrade, and grouping or bunching control devices assigned to the role of router device around noise sources may counteract the degradation of the quality of communication on a network link or network. For example, the system controller 1202 may be configured to assign the additional router devices in portions of the network where the noise source is stronger.

The system controller 1202 may transmit updated network data 1232a, 1232b, that includes the optimized network data, to the lighting devices 1204a, 1204b. The updated network data 1232a, 1232b may include a router list that includes a list of control devices to be assigned as router devices in the network. The updated network data 1232a,

1232b may include an indication of the leader device in the network. The updated network data 1232a, 1232b may include an indication of the end devices in the network, or the indication may be inferred from the lack of an identifier corresponding to the role of a router device or a leader device. The updated network data 1232a, 1232b may be sent as a multicast or broadcast message to the lighting devices 1204a, 1204b. The updated network data 1232a, 1232b may be sent as unicast messages to the lighting devices 1204a, 1204b that indicates the role of each of the devices. After receiving the updated network data 1232a, 1232b, the lighting devices 1204a, 1204b may update their respective roles as indicated in the updated network data 1232a, 1232b.

Although FIG. 12 is described with the system controller 1202 processing the optimization data and assigning roles to other control devices, another control device in the system may similarly process the optimization data and/or assign roles to other devices. For example, the current leader device in the network may similarly operate to process the optimization data and assign roles to other control devices. Additionally, although FIG. 12 illustrates an example with three devices (e.g., the system controller 1202, and lighting devices 1204a, 1204b) transmitting messages during a router optimization procedure, an optimization procedure may be performed by any number of devices. In addition, although FIG. 12 illustrates an example where each device transmits a single optimization message, the devices may each transmit, and respectively measure, multiple optimization messages, which may increase the accuracy of the network data generated by the system controller 1220. The router optimization messages may also or alternatively be transmitted at periodic intervals (e.g., with slight randomization). For example, a router optimization procedure may be triggered periodically (e.g., triggered at regular intervals). The procedure illustrated in FIG. 12 may be an optimization data collection period, which may include the period of time during which the devices on a network transmit, receive, and measure multiple optimization messages.

As described herein, a control device may enter a router optimization mode, for example, based on the receipt of a router optimization mode message. Though the system controller 1202 may be described as the control device that may trigger the router optimization mode at the other control devices and/or process the optimization data, other control devices may be similarly implemented. For example, a lighting device or another control device in the system may be implemented to trigger the optimization mode and/or process the optimization data.

The router optimization mode may be triggered multiple times. For example, the router optimization mode may be first triggered or entered by a first device in a load control system (e.g., a system controller, such as the system controller 110 of the load control system 100). And after completion of first router optimization mode, subsequent entries of the router optimization mode may be triggered by a second control device in the load control system. For example, the second control device may be a control device that is assigned to certain role in the network (e.g., a control device assigned to the role of leader device).

Figure 13:
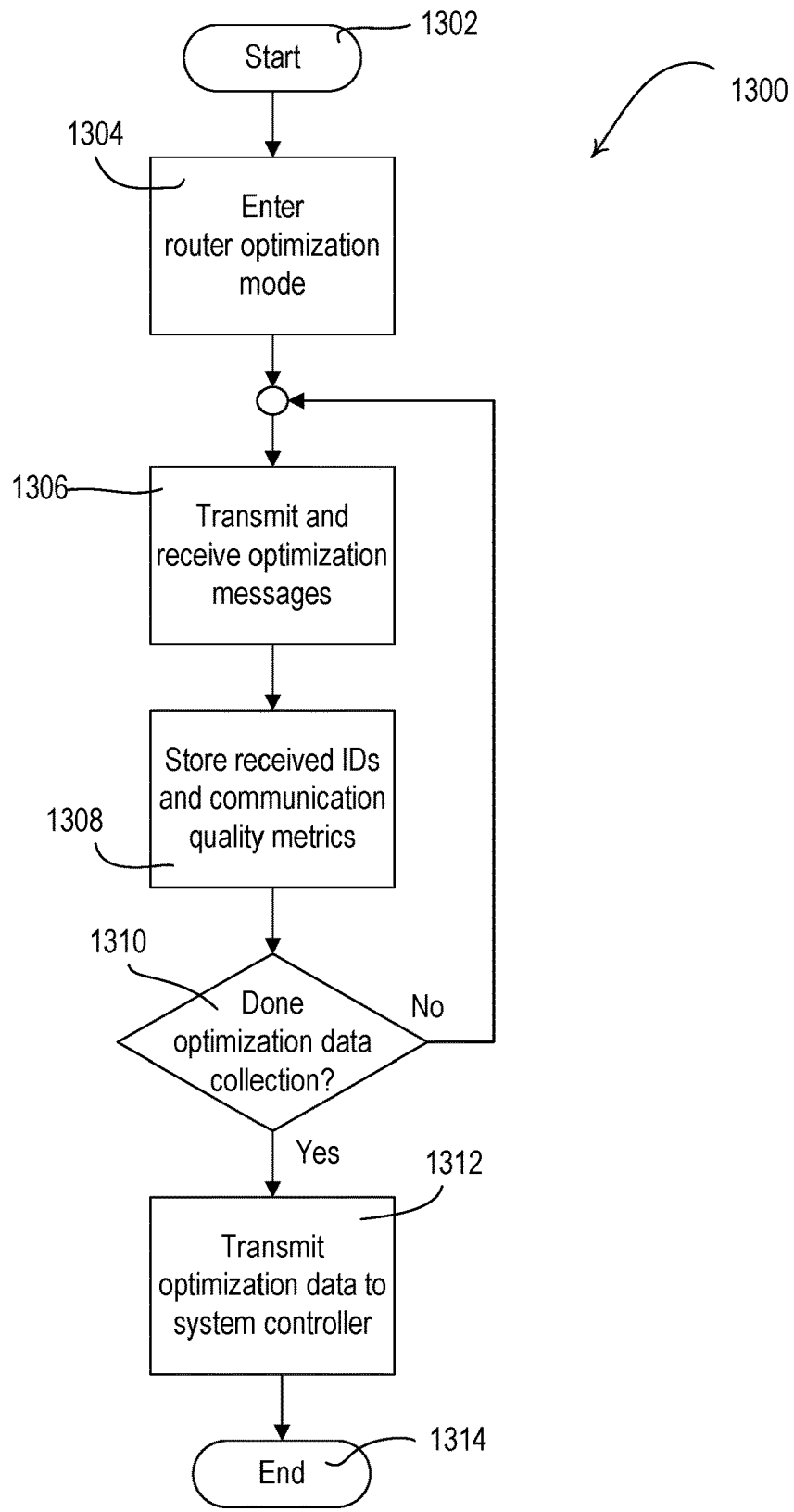
FIG. 13 is a flowchart of an example procedure for collecting optimization data for optimizing the selection of router devices in a network.

FIG. 13 is a flowchart of an example procedure 1300 for collecting optimization data for optimizing the selection of router devices in a network (e.g., the networks 200, 200a, 200b, 200c and/or network partitions 201, 202, 203). The procedure 1300 may be executed by one or more control devices in a load control system that is joined or connected to the network (e.g., each of the leader device, router devices, and/or end devices) as part of a router optimization procedure. For example, each of the control devices in the network may execute the procedure 1300, or portions thereof, at the same time to collect the optimization data. The control devices may be part of a load control system (e.g., the load control system 100).

The control device may start the procedure 1300 at 1302 and enter a router optimization mode at 1304. The control device may start the procedure 1300 at 1302 in response to receiving a router optimization mode message at 1302. The router optimization mode message may be transmitted by a computing device to the control devices directly or to a system controller of the load control system (e.g., the system controller 110, 1202) to cause the system controller to transmit the router optimization mode message to the control devices on the network. A user of the load control system may initiate the router optimization procedure using an application running on a computing device (e.g., the mobile device 190 or other suitable computing device, such as a personal computer). The user may initiate the router optimization procedure after introduction of a noise source (e.g., a wireless access point (WAP)) within the network that may cause network communication problems at the control devices. Also, or alternatively, the router optimization procedure may be periodically initiated (e.g., by the device assigned to the role of leader device). In one example, the introduction of the noise source within the network (e.g., a wireless access point (WAP)) may cause network communication problems at the control devices and the roles of the devices may be updated to optimize the locations of the devices with respect to the noise source for improved network communications.

The user may also, or alternatively, initiate the router optimization procedure in response to receiving network information at the mobile device. For example, prior to entering the router optimization procedure at 1302, the mobile device running the application or the system controller (e.g., via initiation by the mobile device) may send a message to control devices to query control devices on the network to receive network information that may indicate the quality of communications on the network and/or whether control devices are having communication problems on the network. For example, the query may request network information from the control devices, such as recent messages received at the control devices over a period of time, a link quality of communications, a link cost of communications, a noise floor at the control devices, and/or other network information that may indicate the quality of communications at the control devices. In response to receiving the network information, the user or the mobile device may determine to initiate the procedure 1300 in an attempt to improve network communications. For example, the user may initiate the procedure 1300 at the mobile device to cause the mobile device to send the router optimization mode message at 1302. A user may initiate the router optimization procedure when control devices are failing to receive messages that have been transmitted on the network, a link quality of communications is below a threshold, a link cost of communications is above a threshold, or a noise floor at the control devices is above a threshold.

The control device may initiate the router optimization procedure itself (e.g., when the control device is a system controller). The control device may be configured to initiate the router optimization procedure periodically (e.g., every 20 minutes), such that the control device may periodically assess the quality of the communications on the network and correct router placement if there are any communication issues. For example, the control device may initiate the router optimization procedure by periodically transmitting a router optimization mode message at 1302 in an attempt to update the roles of the control devices to improve communications on the network. The control device may periodically query the other control devices and transmit the router optimization message at 1302 in response to receiving network information from the other control devices. For example, prior to entering the router optimization procedure at 1302, the control device may send a message to the other control devices to query the other control devices on the network to receive the network information that may indicate the quality of communications on the network and/or whether the control devices are having communication problems on the network. The system controller may initiate the router optimization procedure by sending the router optimization mode message at 1302 when the control devices are failing to receive messages that have been transmitted on the network, a link quality of communications is below a threshold, a link cost of communications is above a threshold, or a noise floor at the control devices is above a threshold.

Also, or alternatively, the control device may determine that it is experiencing communication issues and automatically determine to transmit the router optimization mode message to the other control devices on the network (e.g., and execute the procedure 1300 at 1302). For example, the control device may monitor its own network information and determine that the control device is having communication problems on the network. The control device may initiate the router optimization procedure by sending the router optimization mode message at 1302 when the control device fails to receive messages that have been transmitted on the network, a link quality of communications at the control device is below a threshold, a link cost of communications at the control device is above a threshold, or a noise floor at the control device is above a threshold.

At 1306, the control device may transmit and receive optimization messages. The optimization messages may be used by the control devices on the network to determine the quality of network links with other nearby control devices. Each optimization message may include a unique identifier (e.g., the network address) of the control device that transmitted the optimization message. For example, the control device may periodically transmit its optimization messages (e.g., as a multicast or broadcast message) to the other control devices at 1306. In addition, the control device may receive the optimization messages from other control devices that are within the communication range of the control device at 1306.

At 1308, the control device may store the unique identifier and a communication quality metric for each optimization messages that is received at 1306. For example, the communication quality metric may indicate a signal strength at which an optimization message was received. The communication quality metric may comprise, for example, a received signal strength identifier (RSSI) of a received optimization message, a link margin, and/or a signal-to-noise ratio value. The control device may calculate the communication quality metric based on one or more link quality thresholds (e.g., the link quality 3 threshold $TH_{LQ3}$, the link quality 2 threshold $TH_{LQ2}$, and/or the link quality 1 threshold $TH_{LQ1}$), as described herein. For example, the control device may set the link quality 3 threshold $TH_{LQ3}$ to an $N^{th}$ percentile (e.g. the $95^{th}$ percentile) value of the background RSSI values that are measured at the control device. The other link quality thresholds $TH_{LQ2}$ and $TH_{LQ1}$ may be set based on the determined link quality 3 threshold $TH_{LQ3}$. The noise floor value NF may be dependent on the $N^{th}$ percentile of the background RSSI values. For example, the link quality 1 threshold $TH_{LQ1}$ may be set equal to the noise floor value NF, or be set to a link margin value above the noise floor value NF. As such, the link margin value or the signal-to-noise ratio value at which the optimization messages are received may be a value that is dependent on the $N^{th}$ percentile value of the background RSSI values to which the link quality 3 threshold $TH_{LQ3}$ may be set. In addition, or alternatively, the communication quality metric may comprise a link quality or link quality indicator (e.g., a link quality in or link quality out).

The communication quality metric may be averaged over time (e.g., the difference between an average value over time of the communication quality metric of the optimization messages received from a particular control device and the noise floor). The control device may continue to store the unique identifiers and communication quality metrics of the received optimization messages at 1308 until the optimization data collection is complete at 1310. For example, the control device may collect the optimization data for a predetermined amount of time and/or another control device (e.g., the system controller, the mobile device, and/or another control device in the network) may transmit a message to the control device to cause the control device to stop collecting the optimization data.

When the optimization data collection is complete at 1310, the control device may transmit the optimization data to the system controller at 1314, and the procedure 1300 may end at 1316. If the communication quality metric is a received signal strength indicator or another value that has not been calculated relative to the noise floor, the optimization data may include the noise floor value and/or the link quality thresholds that are calculated at the control device.

The system controller may use the optimization data (e.g., generated using the procedure 1300 in FIG. 13) to define the optimal roles of the control devices on the network based on the optimization data. As described herein, the system controller may be configured to use the optimization data to generate optimized network data. The optimized network data may define the optimized control devices to be assigned to the role of leader device and/or router device. The optimized network data may be used to optimize the selection of a leader device and router devices in a network.

Figure 14:
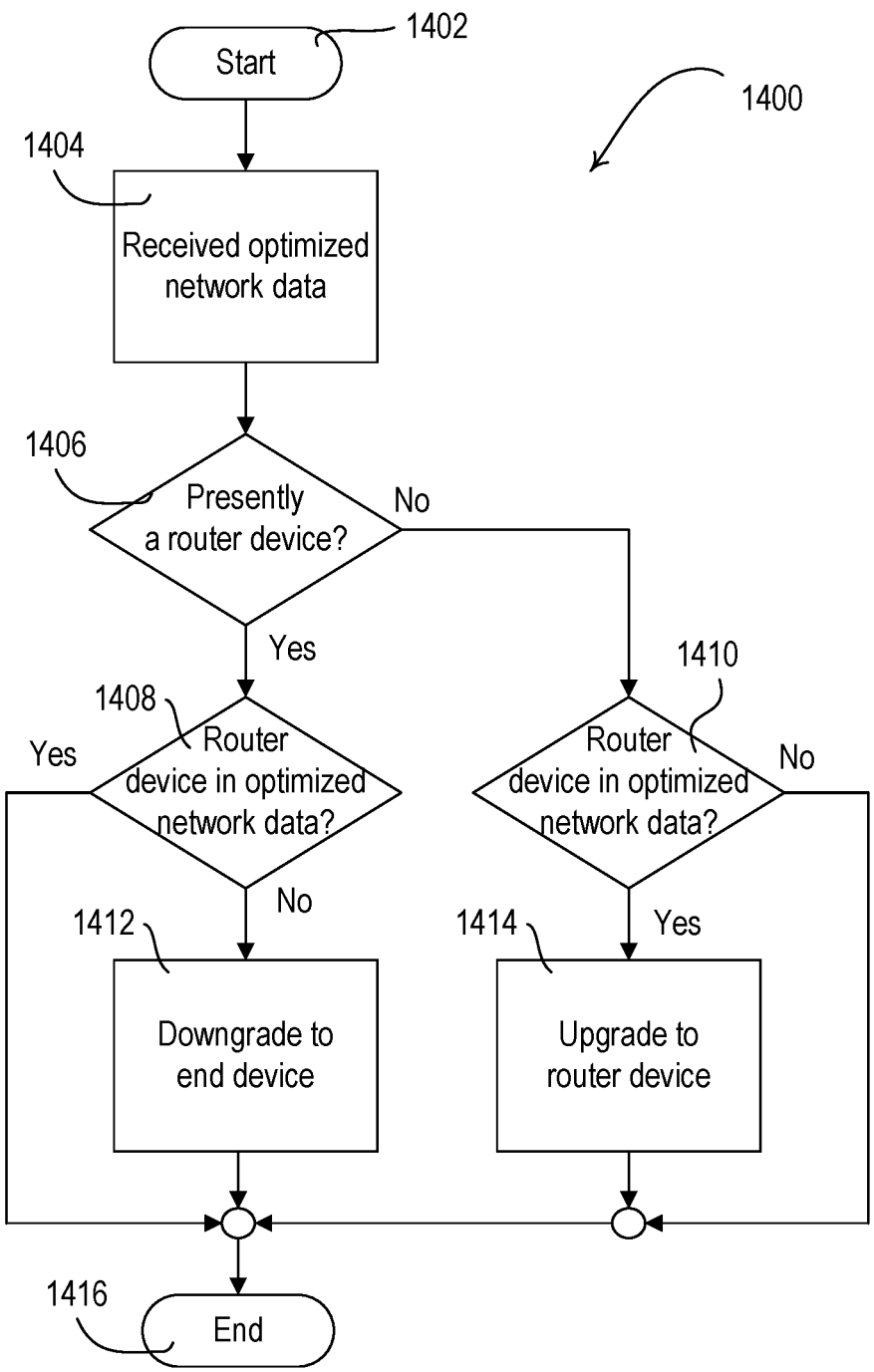
FIG. 14 is a flowchart of an example procedure for that may be performed at a control device for determining its role in a network.

FIG. 14 is a flowchart of an example procedure 1400 for that may be performed at a control device for determining its role in a network (e.g., the networks 200, 200a, 200b, 200c and/or network partitions 201, 202, 203). The procedure 1400 may be executed by a control device in the network (e.g., one of the leader device, router devices, and/or end devices) as part of a router optimization procedure. For example, the procedure 1400 may be executed by a control device of a load control system (e.g., the system controller 110 of the load control system 100) after the system controller assigns the control devices to the router list. During the procedure 1400, the control device may determine its role and operate according to that role as described herein.

The control device may start the procedure 1400 at 1402 and identify the received optimized network data from the system controller or another control device on the network at 1404. The procedure 1400 may be triggered at 1402 by receiving a message that includes the optimized network data. The optimized network data may indicate the leader device and/or the router devices that have been assigned by the system controller or another control device on the network. For example, the optimized network data may include the router list or an indication of the unique identifiers (e.g., network identifiers) of the control devices that have been assigned as router devices in the router list.

At 1406, the control device may determine whether it is presently assigned as a router device in the network. If the control device is presently assigned with another role on the network than a router device (e.g., an end device), the control device may determine at 1410 whether the control device is assigned as a router device in the optimized data. If the control device is not assigned as the router device in the optimized network data, then the procedure 1400 may end, e.g., such that the control device may maintain its role (e.g., as an end device) in the network. If the control device is assigned as a router device in the optimized network data at 1410, then the control device may upgrade its role at 1414 to become a router device and begin operating as a router device as described herein. For example, the control device may send a router request message to the leader device to become a router device on the network. The control device may be added to the router table by the leader device and may begin advertising and operating as a router device as described herein.

One of the control devices may be assigned as a leader device in the optimized network data. At 1410, the control device may determine that it is assigned the role of the leader device in the optimized network data. If control device is assigned the role of the leader device in the optimized network data, the control device may upgrade its role to the leader device at 1414 (e.g., from a router device or an end device).

The control device may await for the current leader device to identify that it is not assigned the role of leader device in the optimized network data and transmit an indication that it is downgrading its role from the leader device. For example, the current leader device may send a leader abdicate message that may be received by the control device before upgrading to the role of the leader device at 1414. The leader abdicate message may indicate to the control device that the leader device is renouncing its position as the leader device and the control device may take over the role as leader device. After the control device upgrades its role to the leader device on the network, it may take over the responsibilities of the leader device on the network. For example, the control device will begin transmitting advertisement messages as the leader device and perform the other leader responsibilities described herein.

If, at 1406, the control device determines that it is presently assigned the role of a router device in the network, the control device may determine at 1408 whether it is assigned as a router device in the optimized network data. If the control device is presently assigned as a router device and is assigned as a router device in the optimized network data, the control device may remain a router device in the network and the procedure 1400 may end. If the control device is presently assigned the role of a router device in the network and is not assigned the role of a router device in the optimized network data, the control device may downgrade its role to an end device at 1412. The control device may also multicast a message indicating that it is to be downgraded to the role of end device, which, as described here, may allow the end devices attached to the control device to initiate attachment procedures with an optimal router device based on the optimized network data.

In downgrading its role from a router device to an end device, the control device may send a router release message to the leader device to be released as a router device from the router table by the leader device. The router release message may be sent as a unicast message directly to the leader device or as a multicast message. The router release message may include the unique identifier of the router device (e.g., the router identifier or other unique identifier) to be released from the router table. The leader device may receive the router release message and release the control device from the router table. The leader device may remove the router identifier of the control device from the router table. The receipt of the router release message at the leader device may allow the leader device to release the control device from the router table proactively before the control device leaves the network or the leader device otherwise waits to determine that the control device has left due to non-responsiveness, which will allow the leader device to update the router table and/or the bitmap sooner than having to wait a period of time to determine that the control device has been lost as a router device.

The proactive removal of the control device from the router table and/or the bitmap will allow end devices to identify the loss of their router device from the network earlier, as they will receive the updated router table and/or bitmap and attempt to attach to another router device (e.g., as a parent device or auxiliary parent device) without having to wait a period of time to determine that their router device has been lost due to non-responsiveness. Upon receiving the router release message, the leader device may transmit an advertisement message including the updated router table having the bitmap indicating that the identified router device has been removed from the network. The router devices on the network may retransmit the advertisement message until the advertisement message is transmitted to each router device and end device on the network. An end device that is a child of the control device that has been removed from the router table may, in response to receiving the advertisement message (e.g., from a parent router device, an auxiliary parent device, or other router device), identify that its parent router device is no longer a router device and send a parent request message to another router device on the network for attaching to a parent.

The control device may be assigned the role of a leader device and may similarly maintain its role or downgrade its role based on the indication of the leader device in the optimized network data. At 1408, the control device may be currently assigned the role of leader device in the network and determine that it is assigned the role of the leader device in the optimized network data. In this case, the control device may maintain its role as the leader device in the network. In another example, the control device may be currently assigned the role of the leader device and determine, at 1408, that it assigned the role of a router device or an end device in the optimized network data and may downgrade its role. If the control device is currently assigned the role of a leader device and is assigned the role of an end device in the optimized network data, the control device may downgrade its role to a router device from the leader device and then downgrade its role to an end device from a router device.

If the control device is downgrading from the leader device to a router device, the leader device may identify the next leader device to take over as the leader device. For example, the control device may downgrade from the leader device to a router device if another control device is identified as a leader device based on the optimized network data. The other control device may be identified as the leader device based on the optimized network data. The control device may change its role from the leader device after sending a leader abdicate message to the leader device indicated in the optimized network data and/or receiving the indication that the next leader device has taken over as the leader device. The leader abdicate message may indicate to the next leader device that the control device is renouncing its position as the leader device and the next leader device may take over the role as leader device, as described herein. The control device may downgrade its role to a router device from the leader device.

If the control device determines that it is an end device in the optimized network data, the control device may downgrade its role to an end device at 1412. As described herein, the control device may send a router release message to the recently upgraded leader device to be released as a router device before downgrading to an end device. The control device that sent the router release message may downgrade its role to an end device at 1412. The procedure may end at 1416.

After the optimization procedure is performed, the end devices (e.g., devices that have been downgraded to end devices) may perform one or more portions of an attachment procedure to attach to a parent device for communicating on the network, as described herein. For example, the attachment procedure may be similar to the attachment procedure 1100 shown in FIG. 11 using one or more of the link quality thresholds (e.g., one or more link quality thresholds $TH_{LQ1}$-$TH_{LQ3}$). The end devices may perform the attachment procedure based on the background RSSI values and/or link quality thresholds established prior to and/or after the optimization procedure is performed. For example, the end devices may perform the procedure 700 shown in FIG. 7, or portions thereof, and/or the procedure 800 shown in FIG. 8, or portions thereof, after the optimization procedure has been performed to update the background RSSI readings and/or the link quality thresholds (e.g., one or more link quality thresholds $TH_{LQ1}$-$TH_{LQ3}$).

As the leader device and/or router devices have been selected during the optimization procedure, one or more end devices may be able to attach to a parent device and improve the link quality between the end device and its parent. Additionally, when the attachment procedure is performed by the end devices after the optimization procedure, the attachment procedure may be performed using less processing resources and/or time at the end devices collectively, as the link quality of the network links between the end devices and the router devices may be higher (e.g., resulting in the link quality thresholds being met earlier) due to the performance of the optimization procedure.

Figure 15:
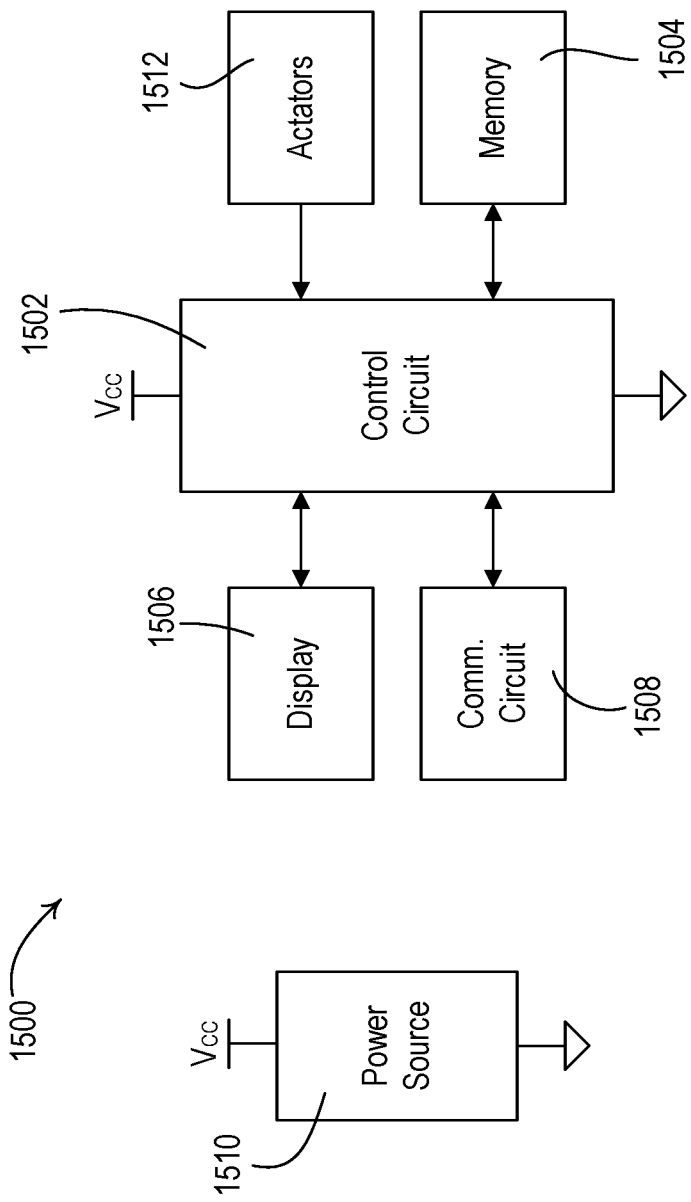
FIG. 15 is a block diagram of an example mobile device.

FIG. 15 is a block diagram illustrating an example mobile device 1500 as described herein. The mobile device 1500 may include a control circuit 1502 for controlling the functionality of the mobile device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the mobile device 1500 to perform as described herein. The control circuit 1502 may store information in and/or retrieve information from the memory 1504. The memory 1504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 1500 may include a communications circuit 1508 for transmitting and/or receiving information. The communications circuit 1508 may perform wireless and/or wired communications. The communications circuit 1508 may include an RF transceiver or other circuit capable of performing wireless communications via an antenna. Communications circuit 1508 may be in communication with control circuit 1502 for transmitting and/or receiving information.

The control circuit 1502 may also be in communication with a display 1506 for providing information to a user. The control circuit 1502 and/or the display 1506 may generate GUIs for being displayed on the mobile device 1500. The display 1506 and the control circuit 1502 may be in two-way communication, as the display 1506 may include a touch screen module capable of receiving information from a user and providing such information to the control circuit 1502. The mobile device 1500 may also include an actuator 1512 (e.g., one or more buttons) that may be actuated by a user to communicate user selections to the control circuit 1502.

Each of the modules within the mobile device 1500 may be powered by a power source 1510. The power source 1510 may include an AC power supply or DC power supply, for example. The power source 1510 may generate a supply voltage $V_{CC}$ for powering the modules within the mobile device 1500.

Figure 16:
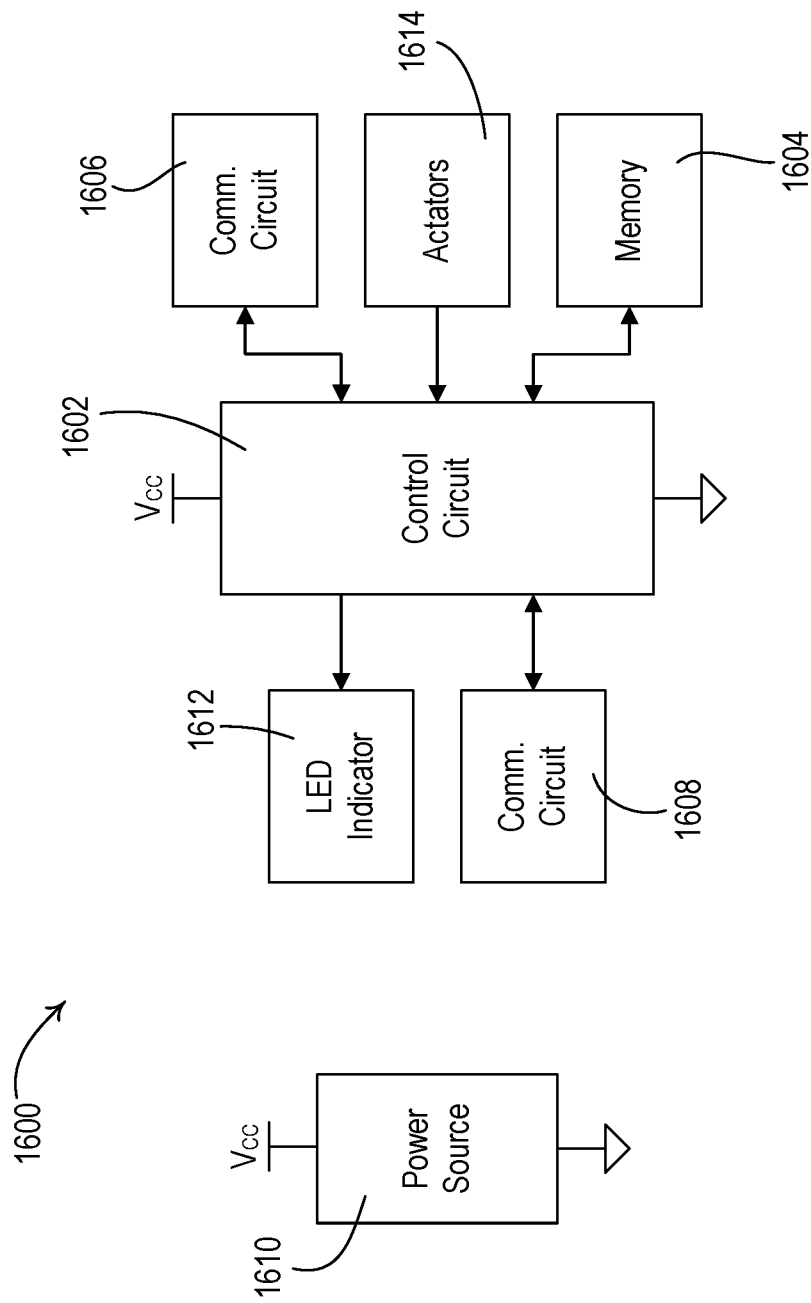
FIG. 16 is a block diagram of an example system controller.

FIG. 16 is a block diagram illustrating an example system controller 1600 as described herein. The system controller may be a gateway system controller, a target system controller, a remote system controller, and/or a combination thereof. The system controller 1600 may include a control circuit 1602 for controlling the functionality of the system controller 1600. The control circuit 1602 may include one or more general purpose processors, special purpose processors, conventional processors, digital signal processors (DSPs), microprocessors, integrated circuits, a programmable logic device (PLD), application specific integrated circuits (ASICs), or the like. The control circuit 1602 may perform signal coding, data processing, power control, input/output processing, or any other functionality that enables the system controller 1600 to perform as described herein. The control circuit 1602 may store information in and/or retrieve information from the memory 1604. The memory 1604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1600 may include a first communication circuit 1606 for transmitting and/or receiving information. The first communication circuit 1606 may perform wireless and/or wired communications on a first wireless communication link and/or network (e.g., a network wireless communication link). The system controller 1600 may also, or alternatively, include a communications circuit 1608 for transmitting and/or receiving information. The second communications circuit 1606 may perform wireless and/or wired communications via a second wireless communication link and/or network. The first and second communication circuits 1606 and 1608 may be in communication with control circuit 1602. The first and second communication circuits 1606 and 1608 may include RF transceivers or other communication modules capable of performing wireless communications via an antenna. The communication circuit 1606 and communication circuit 1608 may be capable of performing communications via the same communication channels or different communication channels. For example, the first communication circuit 1606 may be capable of communicating (e.g., with control devices and/or other devices in the load control system) via the first wireless communication link and/or network using a first communication protocol (e.g., a wireless communication protocol, such as CLEAR CONNECT and/or THREAD protocols). And the second communication circuit 1608 may be capable of communicating via the second wireless communication channel and/or network using a second wireless communication protocol.

The control circuit 1602 may be in communication with an LED indicator 1612 for providing indications to a user. The control circuit 1602 may be in communication with an actuator 1614 (e.g., one or more buttons) that may be actuated by a user to communicate user selections to the control circuit 1602. For example, the actuator 1614 may be actuated to put the control circuit 1602 in an association mode and/or communicate association messages from the system controller 1600.

Each of the modules within the system controller 1600 may be powered by a power source 1610. The power source 1610 may include an AC power supply or DC power supply, for example. The power source 1610 may generate a supply voltage $V_{CC}$ for powering the modules within the system controller 1600.

Figure 17:
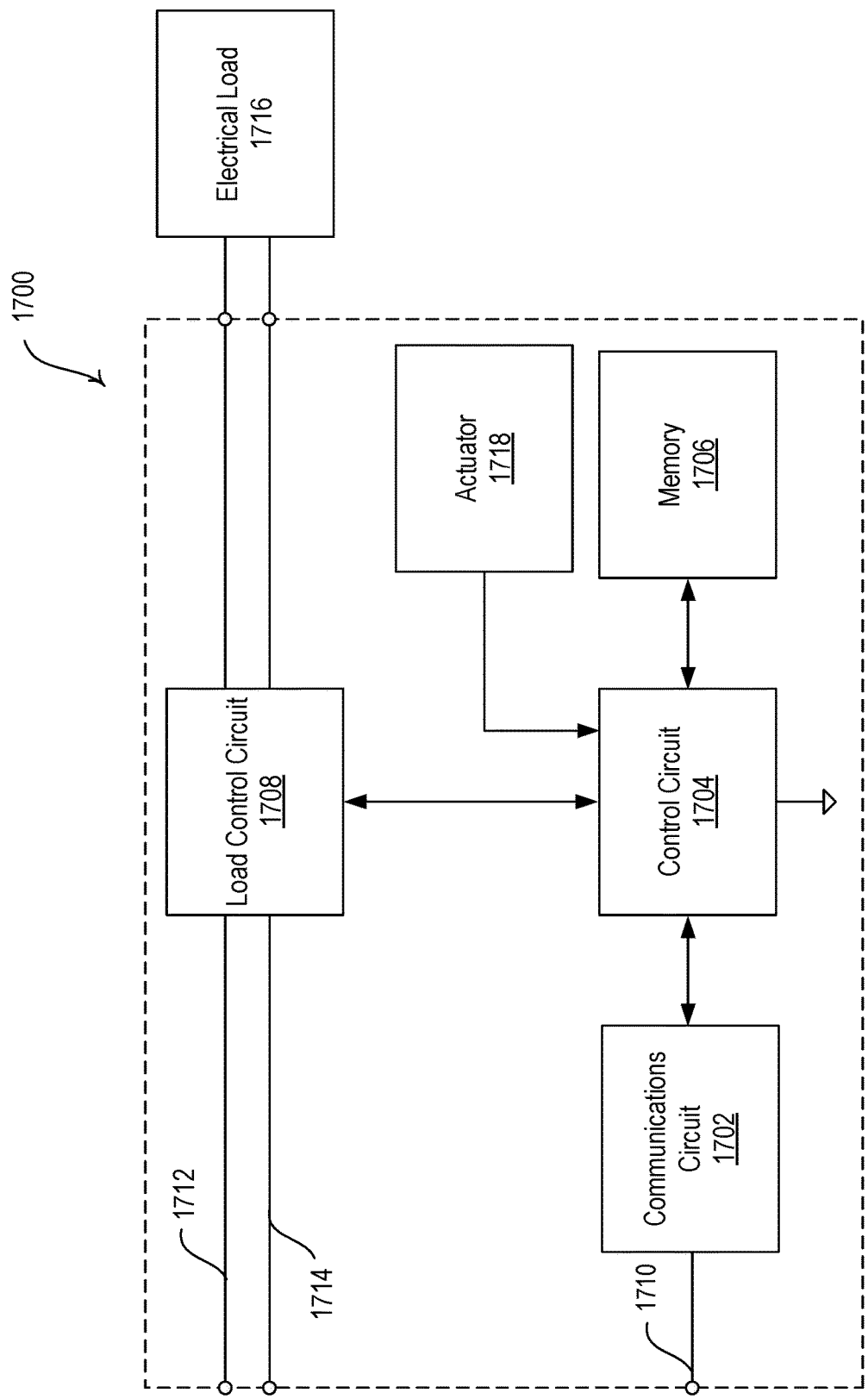
FIG. 17 is a block diagram of an example load control device.

FIG. 17 is a block diagram illustrating an example control-target device, e.g., a load control device 1700, as described herein. The load control device 1700 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 1700 may include a communications circuit 1702. The communications circuit 1702 may include a receiver, an RF transceiver, or other communications module capable of performing wired and/or wireless communications via communication link 1710. The communications circuit 1702 may be in communication with control circuit 1704. The control circuit 1704 may include one or more general purpose processors, special purpose processors, conventional processors, digital signal processors (DSPs), microprocessors, integrated circuits, a programmable logic device (PLD), application specific integrated circuits (ASICs), or the like. The control circuit 1704 may perform signal coding, data processing, power control, input/output processing, or any other functionality that enables the load control device 1700 to perform as described herein.

The control circuit 1704 may store information in and/or retrieve information from the memory 1706. For example, the memory 1706 may maintain a registry of associated control devices and/or control configuration instructions. The memory 1706 may include a non-removable memory and/or a removable memory. The load control circuit 1408 may receive instructions from the control circuit 1704 and may control an electrical load 1716 based on the received instructions. The load control circuit 1708 may send status feedback to the control circuit 1704 regarding the status of the electrical load 1716. The load control circuit 1708 may receive power via the hot connection 1712 and the neutral connection 1714 and may provide an amount of power to the electrical load 1716. The electrical load 1716 may include any type of electrical load, such as a lighting load (e.g., LED, fluorescent lamp, etc.).

The control circuit 1704 may be in communication with an actuator 1718 (e.g., one or more buttons) that may be actuated by a user to communicate user selections to the control circuit 1704. For example, the actuator 1718 may be actuated to put the control circuit 1704 in an association mode and/or communicate association messages from the load control device 1700.

Figure 18:
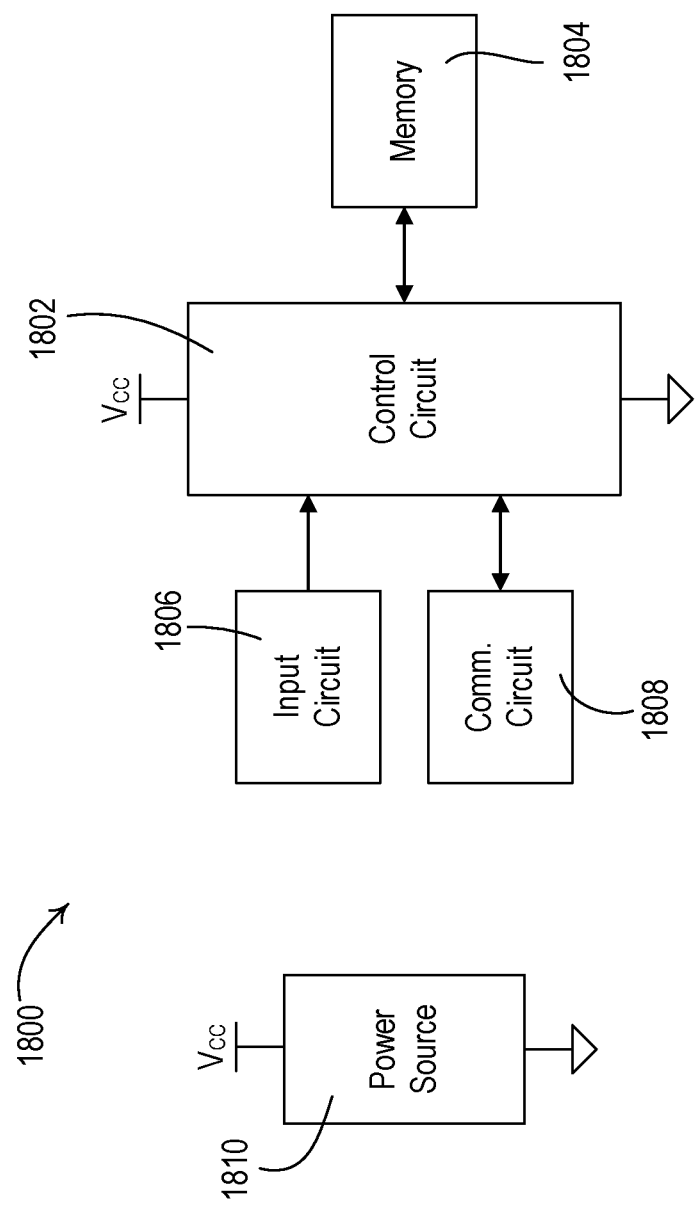
FIG. 18 is a block diagram of an example input device.

FIG. 18 is a block diagram illustrating an example input device 1800, or control-source device, as described herein. The input device 1800 may be a remote control device, an occupancy sensor, a daylight sensor, a temperature sensor, and/or the like. The input device 1800 may include a control circuit 1802 for controlling the functionality of the input device 1800. The control circuit 1802 may include one or more general purpose processors, special purpose processors, conventional processors, digital signal processors (DSPs), microprocessors, integrated circuits, a programmable logic device (PLD), application specific integrated circuits (ASICs), or the like. The control circuit 1802 may perform signal coding, data processing, power control, input/output processing, or any other functionality that enables the input device 1800 to perform as described herein.

The control circuit 1802 may store information in and/or retrieve information from the memory 1804. The memory 1804 may include a non-removable memory and/or a removable memory, as described herein.

The input device 1800 may include a communications circuit 1808 for transmitting and/or receiving information. The communications circuit 1808 may transmit and/or receive information via wired and/or wireless communications. The communications circuit 1808 may include a transmitter, an RF transceiver, or other circuit capable of performing wired and/or wireless communications. The communications circuit 1808 may be in communication with control circuit 1802 for transmitting and/or receiving information.

The control circuit 1802 may also be in communication with an input circuit 1806. The input circuit 1806 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1806 to put the control circuit 1802 in an association mode and/or communicate association messages from the control-source device. The control circuit 1802 may receive information from the input circuit 1806 (e.g. an indication that a button has been actuated or sensed information). Each of the modules within the input device 1800 may be powered by a power source 1810.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A control device for communication with one or more other devices on a network, the control device comprising:
a wireless communication circuit configured to receive a message via radio-frequency (RF) signals; and
a control circuit configured to:
measure background RF energy via the wireless communication circuit when the wireless communication circuit is not receiving a message;
store a plurality of measurements of the background RF energy;
determine an $N^{th}$ percentile value of the stored measurements of the background RF energy;
set a link quality threshold equal to the $N^{th}$ percentile value of the stored measurements of the background RF energy; and
use the link quality threshold to determine another device to which to attach to as a parent device on the network.

2. The control device of claim 1, wherein the control circuit being configured to determine the $N^{th}$ percentile value of the stored measurements of the background RF energy further comprises the control circuit being configured to:
calculate an average value of the background RF energy; and
use the average value of the background RF energy to determine the $N^{th}$ percentile value.

3. The control device of claim 1, wherein the link quality threshold is a first link quality threshold, and wherein the control circuit is further configured to:
set a second link quality threshold relative to the first link quality threshold for use to determine the other device to which to attach to as the parent device on the network.

4. The control device of claim 3, wherein the average value of the background RF energy is a noise floor value, wherein the control circuit is further configured to: calculate the second link quality threshold by adding a respective link margin to the noise floor value.

5. The control device of claim 1, wherein the control circuit is further configured to:
increase the link quality threshold as the background RF energy increases and decrease the link quality threshold as the background RF energy decreases to maintain the Nth percentile value of the background RF energy.

6. The control device of claim 1, wherein the control circuit is further configured to:
attach to the parent device for performing communications on the network.

7. The control device of claim 6, wherein the control circuit being configured to attach to the parent device using the link quality threshold comprises the control circuit being configured to:
transmit, via the wireless communication circuit, a parent request message configured to attempt to attach to one of a plurality of control devices assigned the role of router device;
receive a plurality of parent response messages in response to the transmitted parent request message, each parent response message comprising an identifier of the control device from which the parent response message was received;
store the identifiers and a corresponding communication quality metric of each of the parent response messages;
determine the identifier of the control device assigned the role of router device that has a maximum communication quality metric of the parent response messages that is above the link quality threshold; and
set the identifier of the control device having the maximum communication quality metric above the link quality threshold as the parent device of the control device for performing communications on the network.

8. The control device of claim 7, wherein the link quality threshold is a first link quality threshold that is lower than a second link quality threshold, and wherein the control circuit is further configured to:
determine that none of the communication quality metrics of the plurality of parent response messages are above the second link quality threshold before setting the identifier of the control device having the maximum communication quality metric above the first link quality threshold as the parent device.

9. The control device of claim 7, wherein the communication quality metric comprises one of a link quality value or a received signal strength indicator value.

10. The control device of claim 1, wherein the $N^{th}$ percentile is at least a $95^{th}$ percentile.

11. The control device of claim 1, wherein the control circuit is further configured to:
determine a link quality based on a communication quality metric of a received message and the link quality threshold; and
transmit the link quality to another device configured to perform an optimization procedure.

12. The control device of claim 1, wherein the control circuit is further configured to:
set a noise floor value based on the Nth percentile value;
determine a link margin at which a message is received by subtracting the noise floor value from a received signal strength of the message; and
transmit the link margin to another device configured to perform an optimization procedure.

13. A method comprising:
measuring background RF energy via a wireless communication circuit when the wireless communication circuit is not receiving a message;
storing a plurality of measurements of the background RF energy;
determining an $N^{th}$ percentile value of the stored measurements of the background RF energy;
setting a link quality threshold equal to the $N^{th}$ percentile value of the stored measurements of the background RF energy;
using the link quality threshold to determine another device to which to attach to as a parent device on the network; and
attaching to the parent device for performing communication on the network.

14. The method of claim 13, wherein determining the $N^{th}$ percentile value of the stored measurements of the background RF energy further comprises:
calculating an average value of the background RF energy; and
using the average value of the background RF energy to determine the $N^{th}$ percentile value.

15. The method of claim 14, wherein the link quality threshold is a first link quality threshold, and the method further comprising:
setting a second link quality threshold relative to the first link quality threshold for use to determine the other device to which to attach to as the parent device on the network.

16. The method of claim 15, wherein the average value of the background RF energy is a noise floor value, the method further comprising:
  calculating the second link quality threshold by adding a respective link margin to the noise floor value.

17. The method of claim 13, further comprising:
  increasing the link quality threshold as the background RF energy increases to maintain the Nth percentile value of the background RF energy; and
  decreasing the link quality threshold as the background RF energy decreases to maintain the Nth percentile value of the background RF energy.

18. The method of claim 13, wherein attaching to the parent device using the link quality threshold further comprises:
  transmitting, via the wireless communication circuit, a parent request message configured to attempt to attach to one of a plurality of control devices assigned the role of router device;
  receiving a plurality of parent response messages in response to the transmitted parent request message, each parent response message comprising an identifier of the control device from which the parent response message was received;
  storing the identifiers and a corresponding communication quality metric of each of the parent response messages;
  determining the identifier of the control device assigned the role of router device that has a maximum communication quality metric of the parent response messages that is above the link quality threshold; and
  setting the identifier of the control device having the maximum communication quality metric above the link quality threshold as the parent device of the control device for performing communications on the network.

19. The method of claim 18, wherein the link quality threshold is a first link quality threshold that is lower than a second link quality threshold, the method further comprising:
  determining that none of the communication quality metrics of the plurality of parent response messages are above the second link quality threshold before setting the identifier of the control device having the maximum communication quality metric above the first link quality threshold as the parent device.

20. The method of claim 18, wherein the communication quality metric comprises one of a link quality value or a received signal strength indicator value.

21. The method of claim 13, wherein the $N^{th}$ percentile is at least a $95^{th}$ percentile.

22. The method of claim 13, further comprising:
  determining a link quality based on a communication quality metric of a received message and the link quality threshold; and
  transmitting the link quality to another device configured to perform an optimization procedure.

23. The method of claim 13, further comprising:
  setting a noise floor value based on the $N^{th}$ percentile value;
  determining a link margin at which a message is received by subtracting the noise floor value from a received signal strength of the message; and
  transmitting the link margin to another device configured to perform an optimization procedure.

24. A load control system comprising:
  a first control device configured to:
  receive a message on a network link from another device on a network;
  calculate a communication quality metric that indicates a received signal strength at which the message was received; and
  transmit the communication quality metric; and
  a second control device configured to:
  receive the communication quality metric;
  determine, based on the communication quality metric, optimized network data that includes a list of control devices assigned a role of router device on the network; and
  transmit the optimized network data to the first control device, wherein the optimized network data is configured to cause the first control device to upgrade to a role of router device and operate as the router device on the network.

25. The load control system of claim 24, wherein the first control device is further configured to:
  measure background RF energy when the first control device is not receiving a message;
  store a plurality of measurements of the background RF energy;
  determine an $N^{th}$ percentile value of the stored measurements of the background RF energy; and
  set a link quality threshold equal to the Nth percentile value of the stored measurements of the background RF energy.

26. The load control system of claim 25, wherein the first control device is further configured to:
  set a noise floor value based on the $N^{th}$ percentile value;
  determining a link margin at which the message is received by subtracting the noise floor value from the received signal strength of the message; and
  transmit the link margin to the second control device.

27. The load control system of claim 26, wherein the second control device is configured to:
  use the link margin to determine a strength of the network link on which the message is received at the first control device; and
  assign a role to the first control device on the network based on the strength of the network link on which the message is received at the first control device.

28. The load control system of claim 26, wherein the second control device is further configured to:
  process the link margin using a quality threshold to assign the role of the first control device on the network.

29. The load control system of claim 28, wherein the quality threshold is a link quality.

30. The load control system of claim 28, wherein the second control device is further configured to:
  transmit the role to the first control device, wherein the role of the first control device is configured to upgrade the first control device to a router device on the network.

31. The load control system of claim 26, wherein the $N^{th}$ percentile is at least a $95^{th}$ percentile.

* * * * *